United States Patent
Hauser et al.

(10) Patent No.: US 9,173,052 B2
(45) Date of Patent: Oct. 27, 2015

(54) BLUETOOTH LOW ENERGY WATCH WITH EVENT INDICATORS AND ACTIVATION

(71) Applicant: ConnecteDevice Limited, Wanchai (HK)

(72) Inventors: Peter Hauser, Kirkland, WA (US); Henri-Nicolas Olivier, Happy Valley (HK)

(73) Assignee: ConnecteDevice Limited, Wanchai (HK)

( * ) Notice: Subject to any disclaimer, the term of this patent is extended or adjusted under 35 U.S.C. 154(b) by 154 days.

(21) Appl. No.: 13/862,801

(22) Filed: Apr. 15, 2013

(65) Prior Publication Data
US 2013/0303087 A1    Nov. 14, 2013

Related U.S. Application Data

(60) Provisional application No. 61/644,167, filed on May 8, 2012.

(51) Int. Cl.
H04W 4/00    (2009.01)
H04W 4/20    (2009.01)

(52) U.S. Cl.
CPC .............. *H04W 4/008* (2013.01); *H04W 4/206* (2013.01)

(58) Field of Classification Search
CPC ............................. H04W 4/008; H04W 4/206
USPC ....................................................... 455/41.2
See application file for complete search history.

(56) References Cited

U.S. PATENT DOCUMENTS

| | | |
|---|---|---|
| 6,556,222 B1 | 4/2003 | Narayanaswami |
| 7,284,123 B2 | 10/2007 | Kim |
| 2006/0153370 A1 | 7/2006 | Beeson |
| 2007/0037605 A1 | 2/2007 | Logan |
| 2009/0305744 A1 | 12/2009 | Ullrich |
| 2010/0215170 A1 | 8/2010 | Kannappan |
| 2011/0021143 A1* | 1/2011 | Kapur et al. .................. 455/41.2 |
| 2011/0059769 A1* | 3/2011 | Brunolli ................ G08C 17/02 455/556.1 |
| 2011/0281568 A1 | 11/2011 | Le Clech |
| 2012/0214418 A1* | 8/2012 | Lee et al. ..................... 455/41.2 |
| 2014/0068494 A1 | 3/2014 | Petersen et al. |
| 2014/0181715 A1 | 6/2014 | Axelrod et al. |
| 2014/0181741 A1 | 6/2014 | Apacible et al. |

FOREIGN PATENT DOCUMENTS

WO  WO 2011/063516 A1   6/2011
WO  PCT/US2015/21976   3/2015

OTHER PUBLICATIONS

U.S. Appl. No. 14/253,231, filed Apr. 15, 2014, Hauser et al.
(Continued)

*Primary Examiner* — David Bilodeau
(74) *Attorney, Agent, or Firm* — Daly, Crowley, Mofford & Durkee, LLP

(57) ABSTRACT

A system for communicating via a wireless link is disclosed. The system may include a watch movement, a wristband, or an appliance. The system may also include a microprocessor having a Bluetooth® low energy radio. The microprocessor may be configured to receive a notification of an event from a Bluetooth® device and, in response to receiving the notification, activate an indicator on the watch movement, wristband, or appliance. Furthermore, the microprocessor may be configured to receive user input and transmit data via a Bluetooth® link to a smartphone or tablet where it may be received by an application.

29 Claims, 24 Drawing Sheets

(56) References Cited

OTHER PUBLICATIONS

PCT Search Report and Written Opinion of the ISA dated Sep. 4, 2014; for U.S. Pat. App. No. PCT/US2014/037091; 12 pages.

PCT Search Report of the ISA for PCT/US2015/021976 dated Jul. 1, 2015, 3 pages.
PCT Written Opinion of the ISA for PCT/US2015/021976 dated Jun. 30, 2015, 9 pages.

* cited by examiner

| Name | Sent By | Description |
| --- | --- | --- |
| Read | CLIENT, SERVER | Perform a Read Operation |
| Write | CLIENT, SERVER | Perform a Write Operation |
| Confirm | CLIENT, SERVER | Confirm a Write Operation |
| Error | CLIENT, SERVER | Read or Write Operation Failed |
| Supported New Alert Category | CLIENT | Categories of New Alerts (SMS, Email, IM, etc.) Supported by Phone |
| New Alert | CLIENT | A New Alert (SMs, Email IM, etc.) |
| Support Unread Alert Category | CLIENT | Categories of Unread Alerts Supported by Phone |
| Unread Alert Status | CLIENT | Updates the Number of Unread Alerts for the Given Category |
| Alert Notification Control Point | SERVER | Configures Alert Notification Features |
| Current Time | SERVER | Sets the Current Time |
| Local Time Information | CLIENT | Returns Time Reference Information |
| Reference Time Information | CLIENT | Return Time Reference Information (Network, Manual, etc.) |
| Battery Level | CLIENT, SERVER | The Battery Charge % |
| Alert Status | CLIENT | Current Phone Alerting State |
| Ringer Setting | CLIENT | Current Phone Ringer State |
| Ringer Control Point | SERVER | Control the Phone Alerting and Ringer Settings |
| Trigger | SERVER | Trigger an Alert or Predefined Action |
| Alert Acknowledged | SERVER | User Has Acknowleged Alert on Watch |
| Battery Low | CLIENT | Battery Low |
| Configurable Item | CLIENT | Read or Write Configurable Parameter |
| Trigger Acknowledged | CLIENT | User Has Acknowleged a Trigger Alert |
| Hardware Test | CLIENT | Peform Hardware GPIO Test |
| RF Test Mode | CLIENT | Enable RF Test Mode |

*FIG. 10*

BLUETOOTH LOW ENERGY WATCH WITH EVENT INDICATORS AND ACTIVATION

RELATED APPLICATIONS

This application claims priority to and the benefit of U.S. Provisional Patent Application No. 61/644,167, filed May 8, 2012, titled CONNECTED DEVICE PLATFORM, which is incorporated here by reference in its entirety.

FIELD OF THE INVENTION

This invention relates to a flexible Bluetooth® Low Energy 4.0 (BTLE) wireless platform that is integrated into numerous ordinary devices thereby creating a plurality of connected devices that may be monitored and controlled by any mobile device such as a tablet or mobile phone that supports a mobile application, (BLUE-TOOTH® is a registered trademark of Bluetooth® SIG Inc. in the U.S. and other countries). Furthermore, the ecosystem extends the user's social network to the user's connected devices via the connected device platform.

BACKGROUND OF THE INVENTION

An entire generation exists today that has never experienced life without a mobile phone. This generation, sometimes called the "Connected Generation" or "Generation C" is always in touch, even when on the move, on account of the proliferation of smart phones, the internet, tablet computers, laptops, etc. More recently social networks have erupted, with the predominant social network sites having over 800 Million subscribers.

Therefore, some people have become dependent upon immediate access to their social networks, and mobile computing platforms have become more and more prevalent. For example, some teenagers text constantly; sending over 10,000 texts a month. Other people spend more time on their social network pages than they do watching television. These people want to know immediately when something occurs in their social networks or when they receive a text so that they cars respond.

Devices—such as smart watches, connected music players (e.g. iPod Touch and iPod Nano devices), smartphones, tablet computers, and eBook readers—have evolved to address this need. Most are connected directly to the internet via Wi-Fi links or via the 3G or 4G network. Others may use classic Bluetooth® wireless technology to extend mobile phone notifications to a smart watch or some other accessory.

These devices have become smaller and more readily available, featuring many of the features of the mobile phone and placing it directly on the wrist. However, these devices suffer from major drawbacks. They generally require frequent recharging and are typically not waterproof. Thus, users are forced to worry about yet another device that they need to recharge and that they cannot use in the shower or the outdoors.

Bluetooth® Low Energy technology has enabled further development of new devices, such as smart watches, by reducing the power consumed by the radio link and thus enabling the use of coin-cell batteries. These watches typically have rich interfaces and display text on the watch face. Users of these devices frequently complain that they cannot read the text on account of its small size, that the digital display is not very elegant, and that they prefer an analog watch.

As low power wireless technology continues to develop and become more ubiquitous, with native mobile device support tor the technology being offered and with Application Interfaces (APIs) to facilitate the creation of new mobile applications, it further opens the door for innovation whereby ordinary devices may be enhanced through the addition of this low power wireless technology.

The connected device platform is a Bluetooth® Low Energy (BTLE) platform that addresses the user's need to stay connected by extending the user's social network to devices such as analog watches, headsets, backup batteries, or even coffee makers. The connected, device platform also offers extended visibility and control over these devices directly from the mobile device, and enables users to respond to events on their mobile device directly from their connected device.

Because of the low power consumption of the Bluetooth® Low Energy connection, these devices may never require recharging and may enjoy a battery life of up to 1 year or more on a single coin-cell battery.

Furthermore, because of its small size, 10 structures, and specialized firmware that can maximize the microprocessor's computational capability, the connected, device platform may directly drive an analog or digital watch display and manage multiple digital inputs and outputs. Thus the connected device platform may be integrated into a connected analog watch movement.

DRAWING FIGURES

FIG. 10 shows the Connected Device Protocol Message Types

Figure 11:
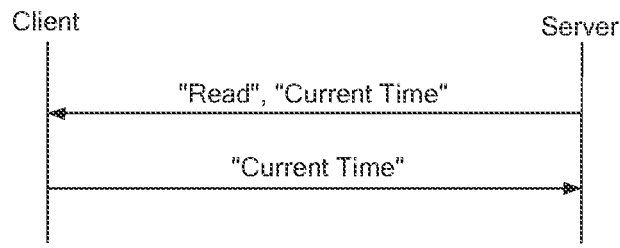
Figure 12:
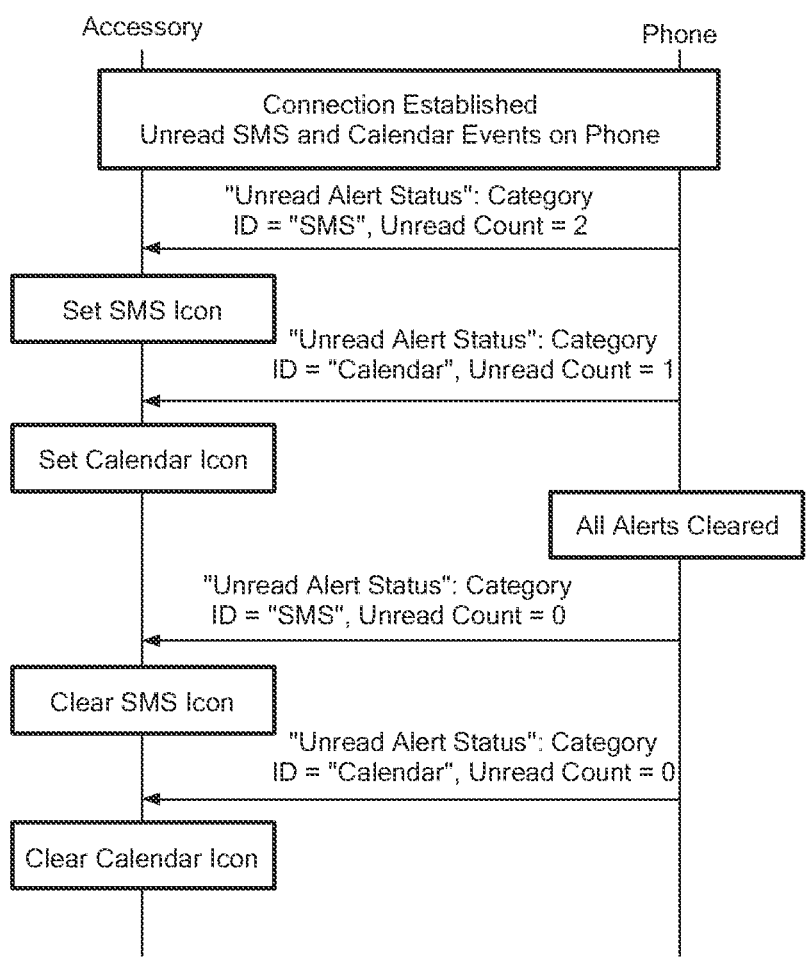
Figure 13:
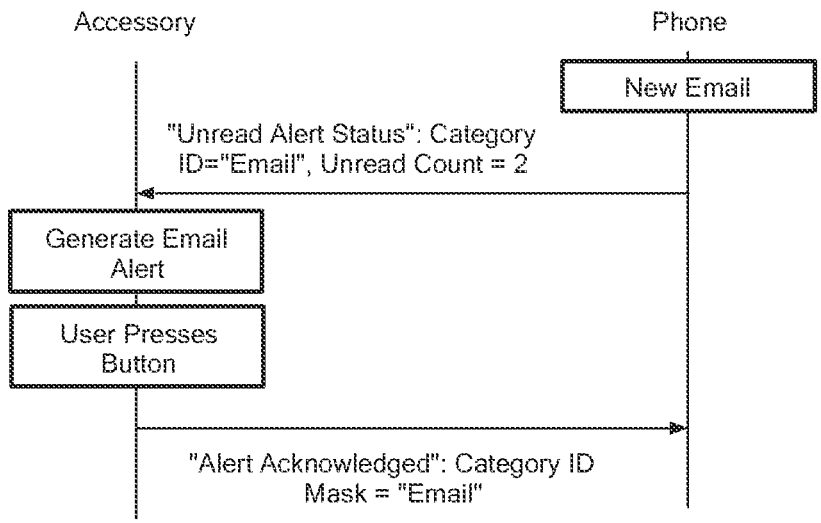
Figure 14:
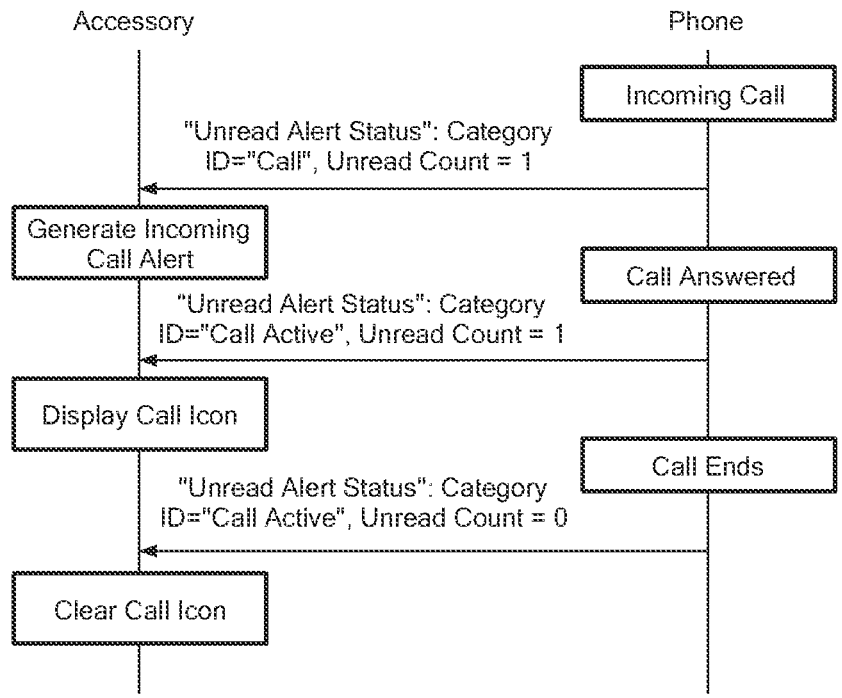
Figure 15:
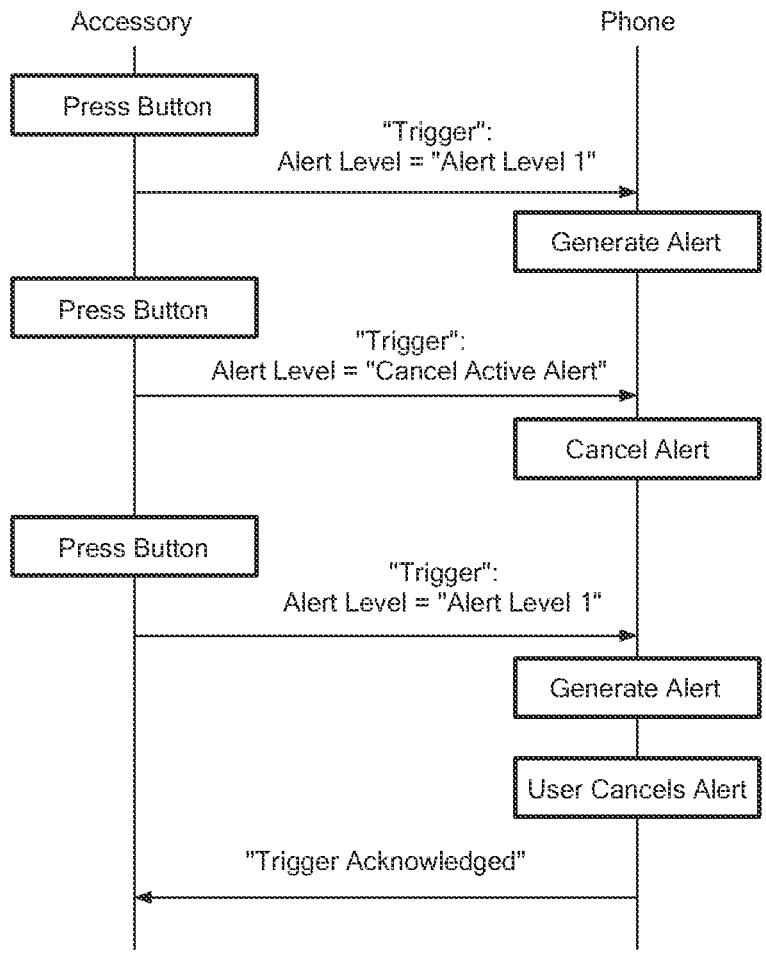
Figure 16:
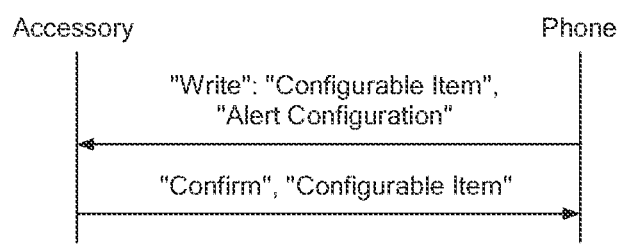
Figure 17:
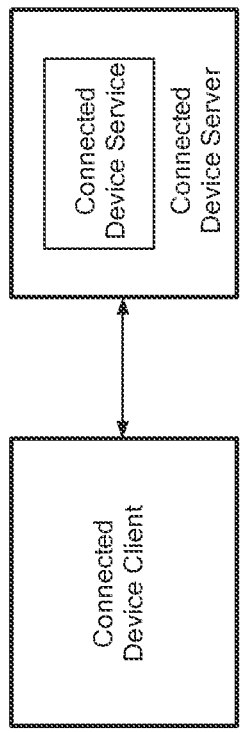
Figure 18:
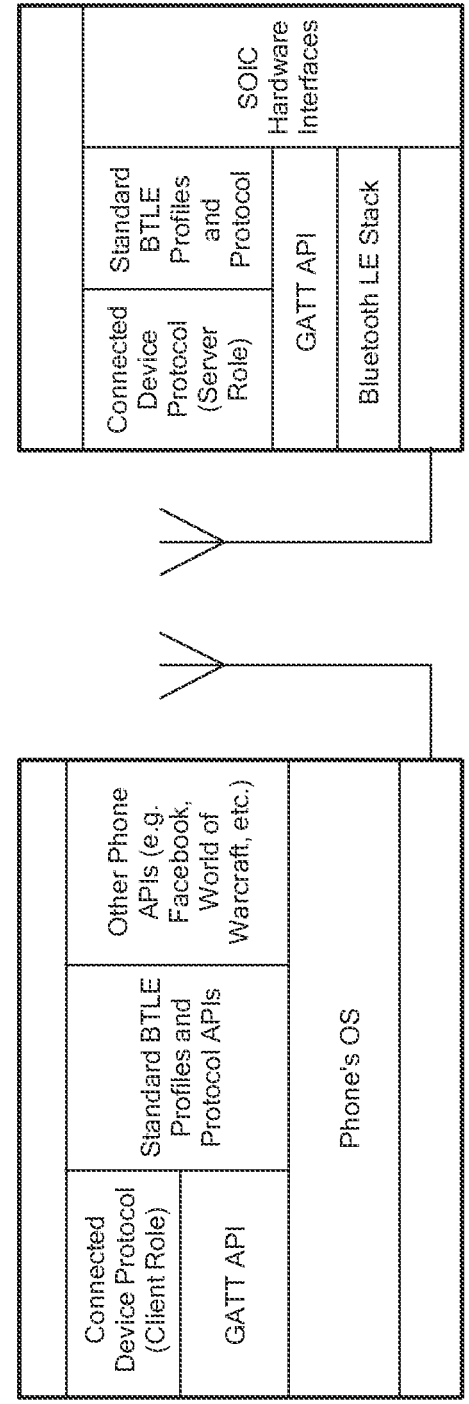
Figure 19:
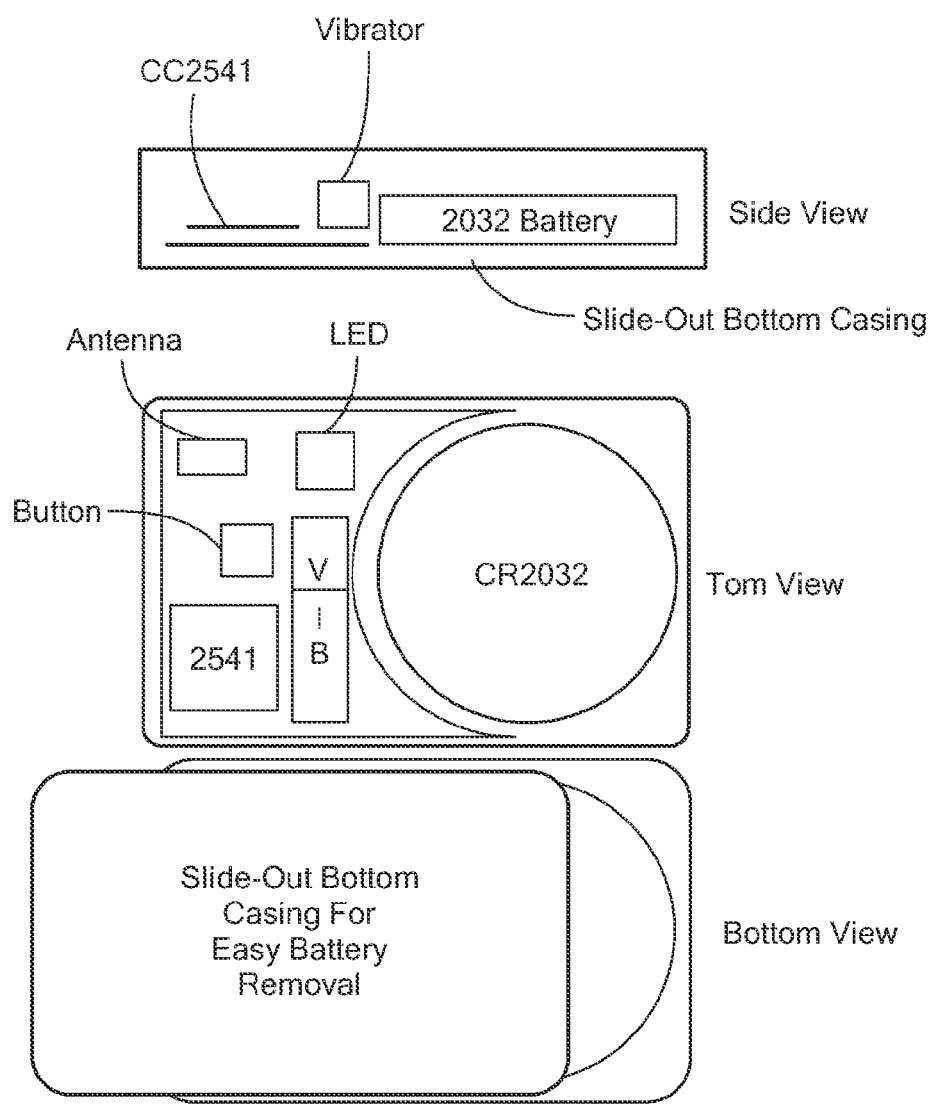
Figure 20:
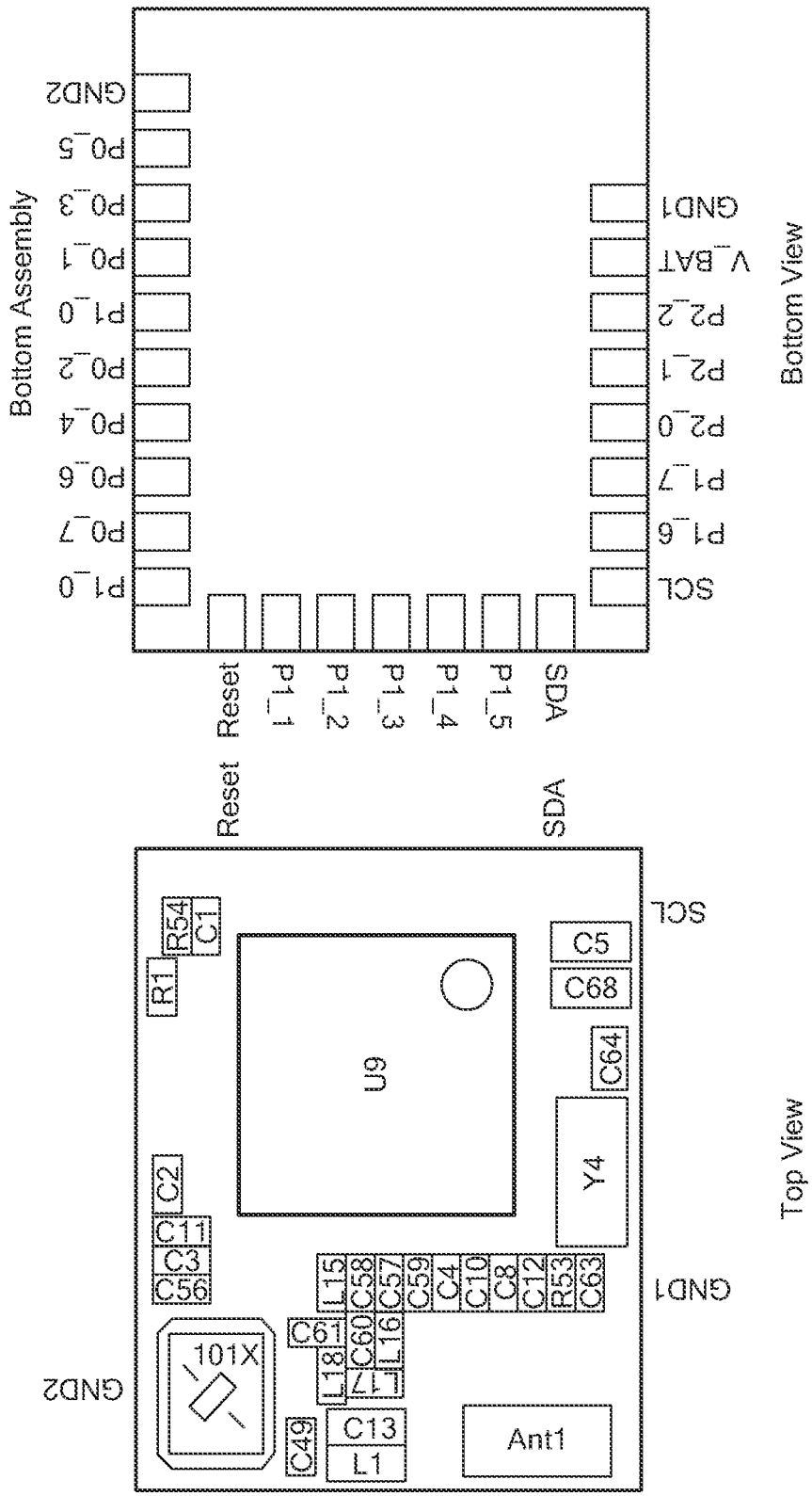
Figure 22:
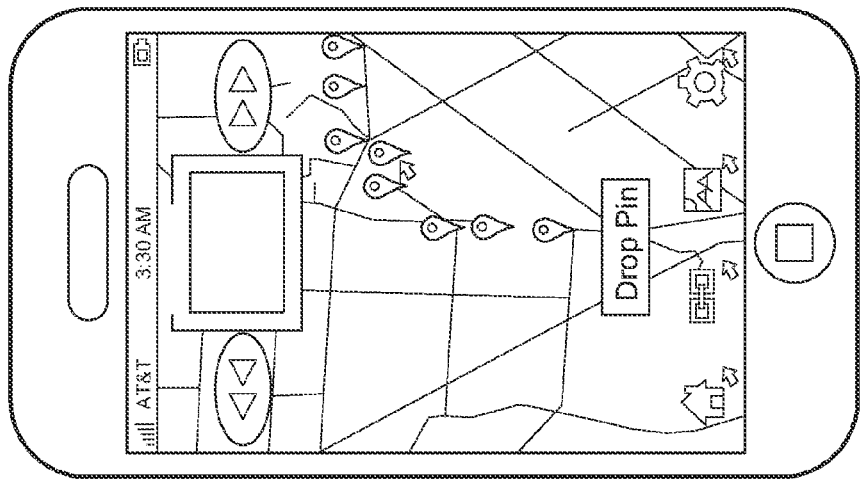
Figure 21:
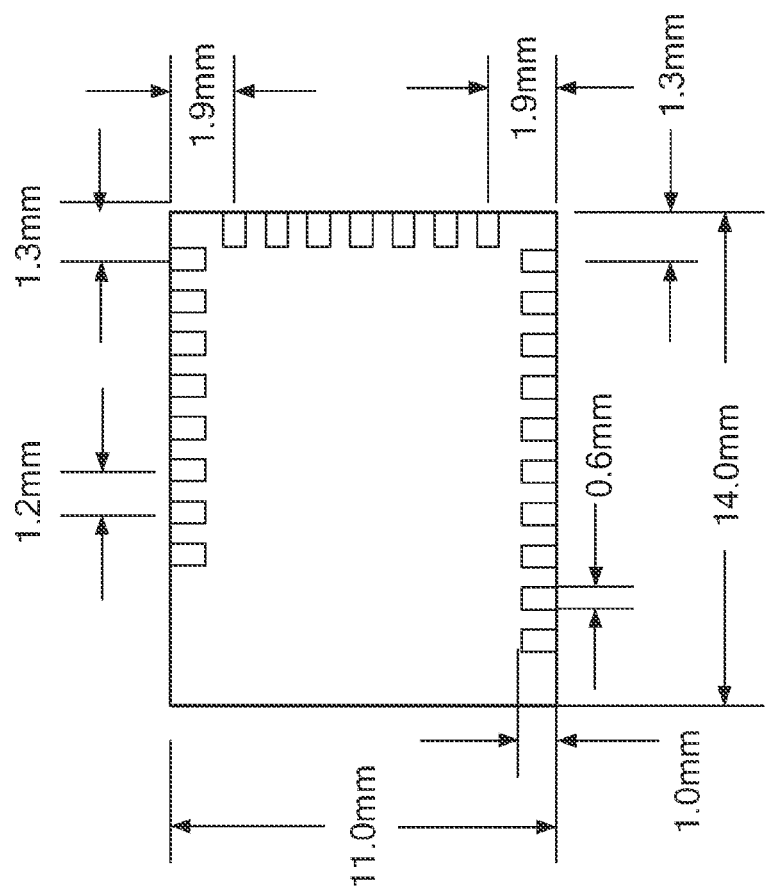
Figure 23:
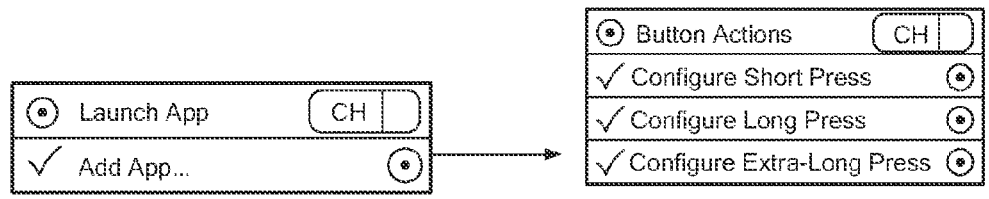
Figure 24:
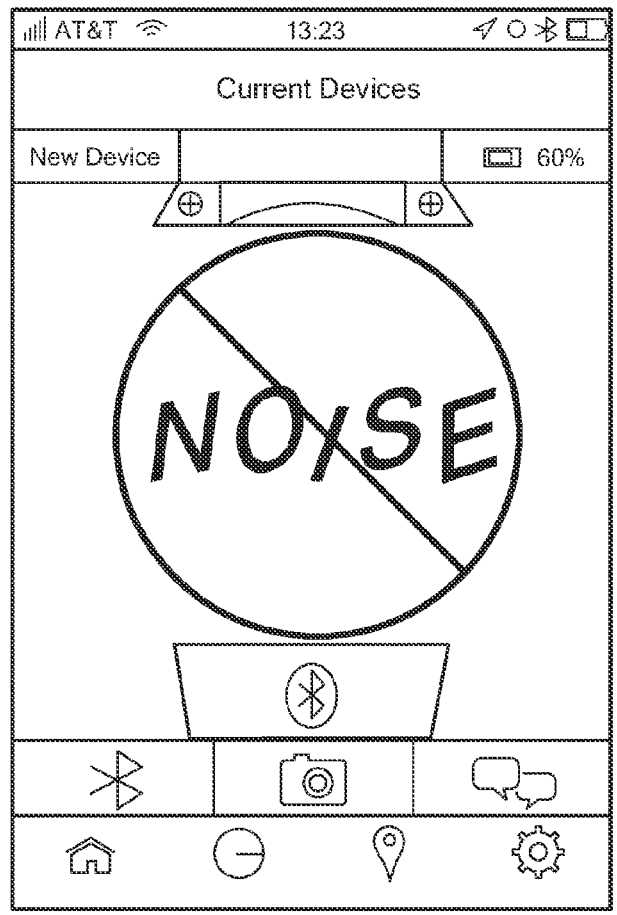
Figure 25:
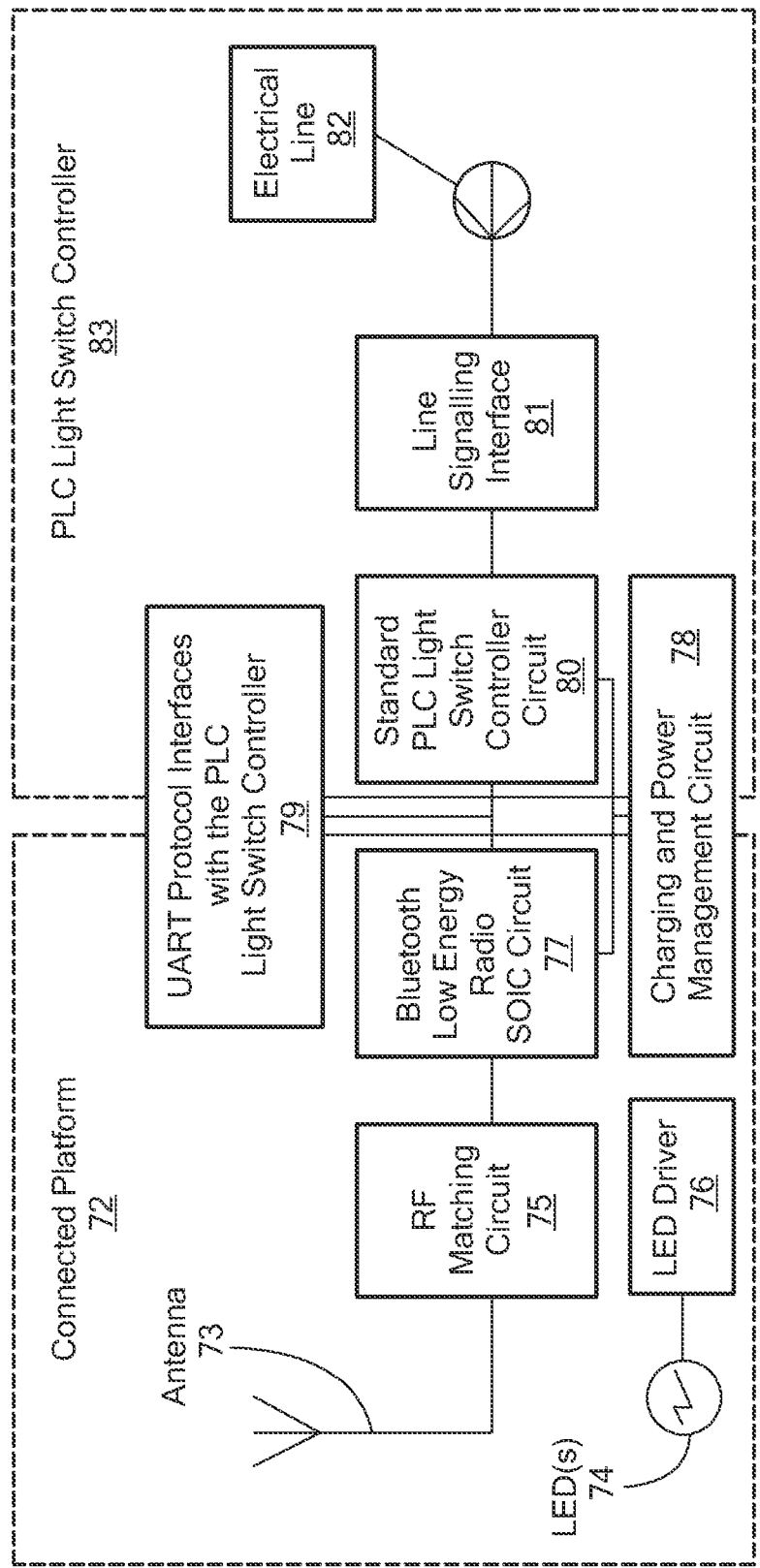
Figure 26:
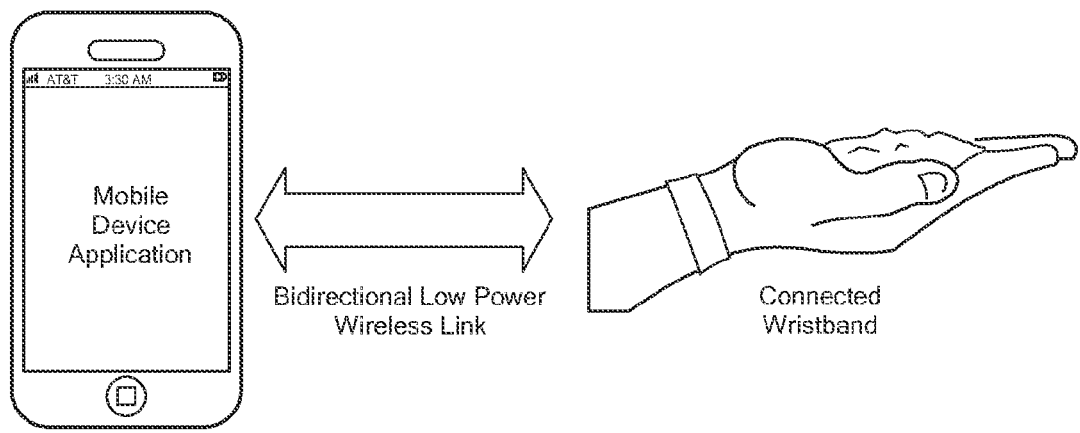
Figure 27:
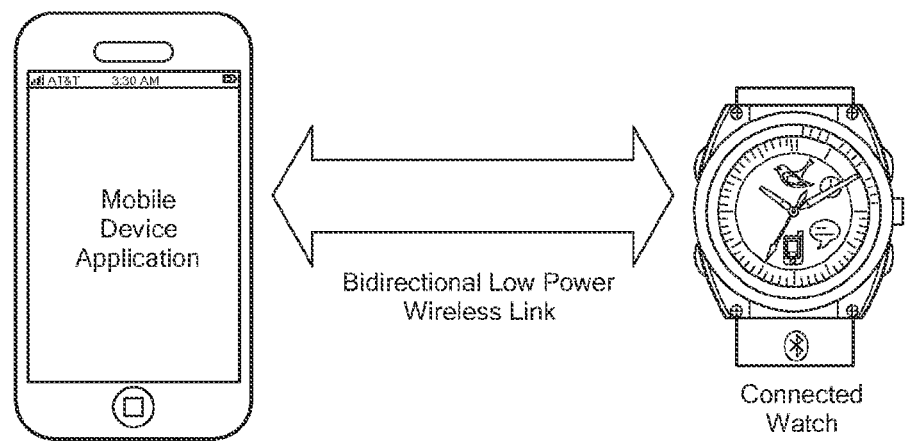
Figure 28:
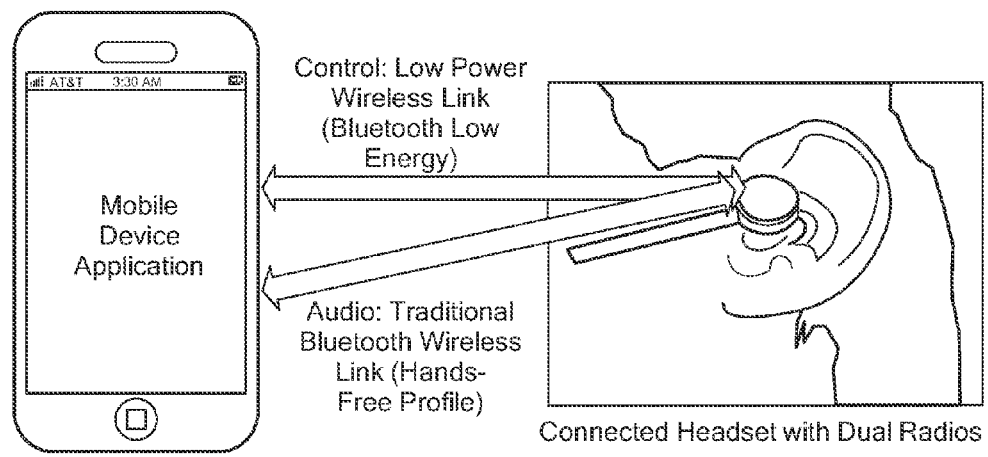
Figure 29:
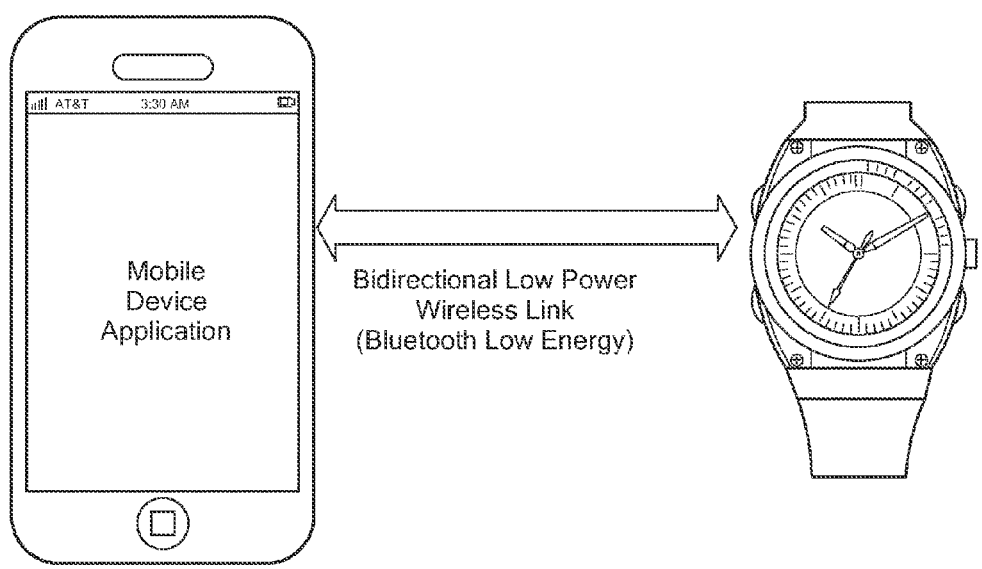
Figure 30:
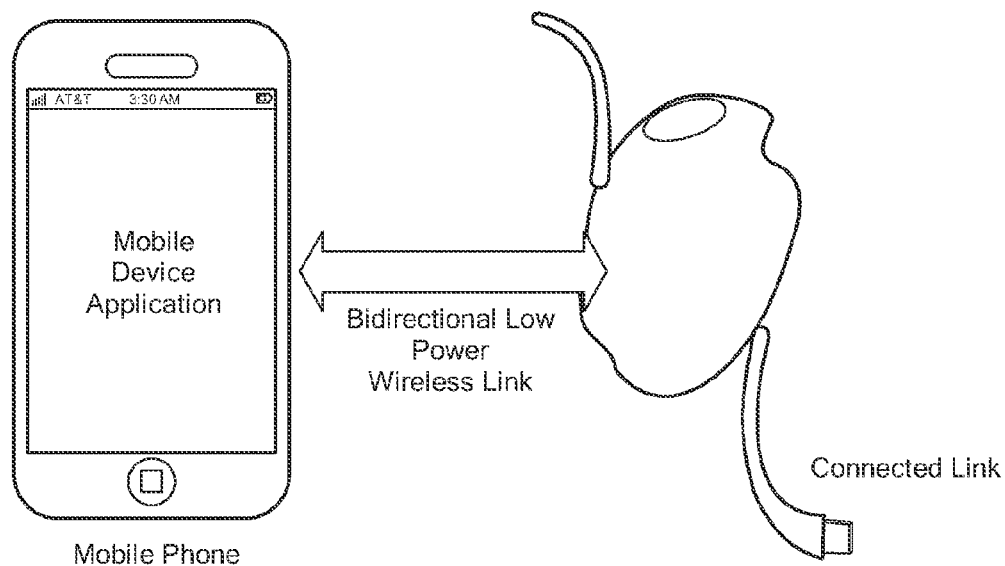
Figure 31:
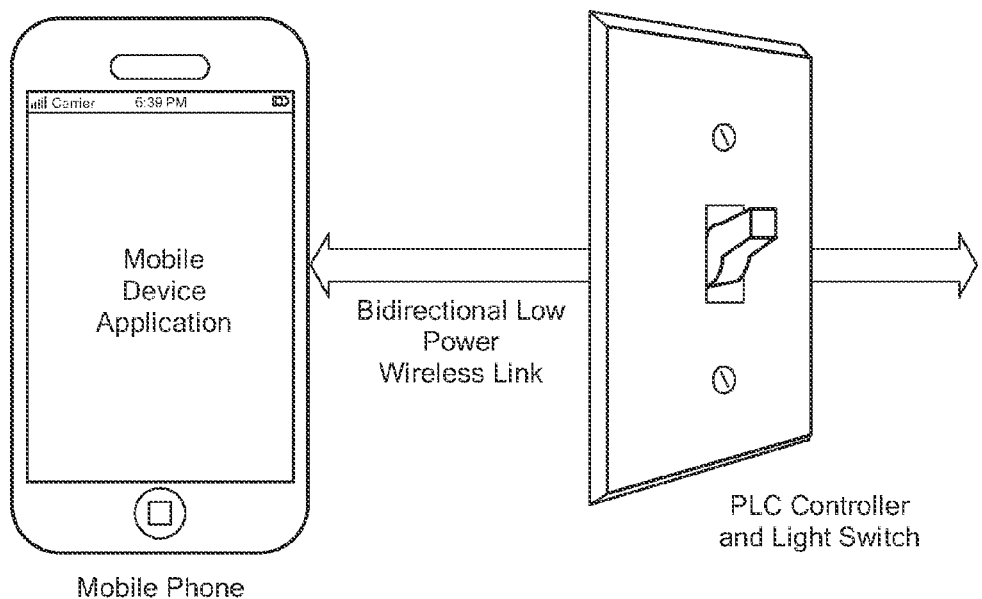
Figure 32:
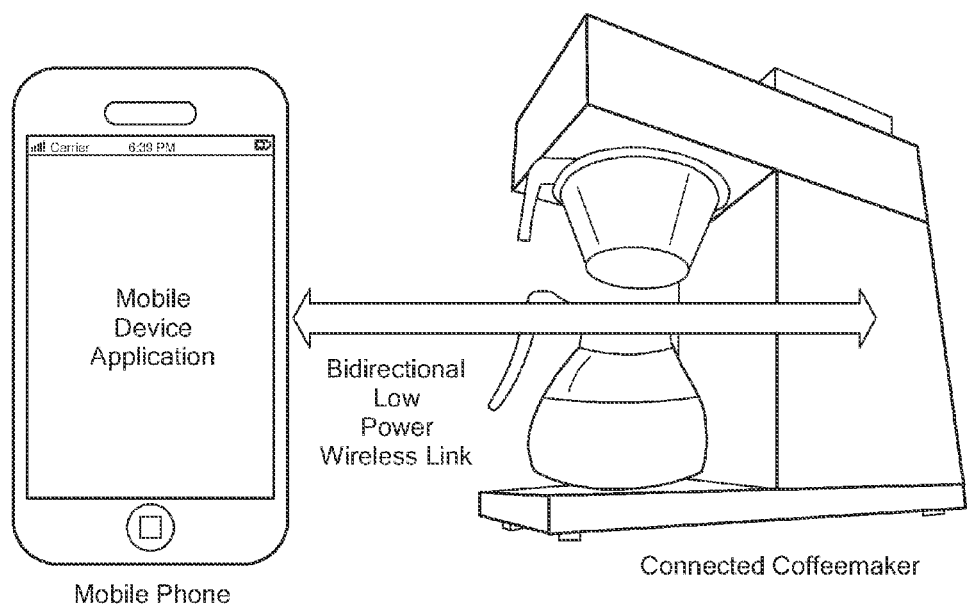

FIG. 11 shows the Connected Device Protocol Sequence for Setting Current Time FIG. 12 shows the Connected Device Protocol Sequence for Unread SMS and Calendar Events FIG. 13 shows the Connected Device Protocol Sequence for Acknowledging an Alert FIG. 14 shows the Connected Device Protocol Sequence for Clearing an Alert FIG. 15 shows the Connected Device Protocol Sequence for Triggering a Phone Event or Alert FIG. 16 shows the Connected Device Protocol Sequence for Setting a Configurable Item FIG. 17 shows the Connected Device Protocol Service Relationship FIG. 18 shows the Application-to-Connected Device Interaction FIG. 19 shows the Connected Module Mechanical Layout FIG. 20 shows the Connected Module Part Placement and Pinout FIG. 21 shows the Connected Module Dimensions FIG. 22 shows the Connected Mobile Phone Application Pinning a Point Of Interest (POI) on a Map FIG. 23 shows the Connected Mobile Phone Application Settings for Launching Apps from User Actions FIG. 24 shows the Connected Mobile Phone Application Displaying a Phone Finder Alert FIG. 25 shows the Connected PLC Light Switch Directly Controlled via a Mobile Application FIG. 26 shows the Mobile Device Application Interacting with a Connected Watch FIG. 27 shows the Mobile Device Application Interacting with a Connected Wristband FIG. 28 shows the Mobile Device Interacting with a Connected Headset FIG. 29 shows the Mobile Device Application Interacting with a Connected LED Watchband or Watch FIG. 30 shows the Mobile Device Application Interacting with a Connected Battery FIG. 31 shows the Mobile Device Application Interacting with a Connected PLC Controller and Light Switch FIG. 32 shows the Mobile Device Application Interacting with a Connected Coffeemaker

DETAILED DESCRIPTION

Connected Device Platform

Figure 1:
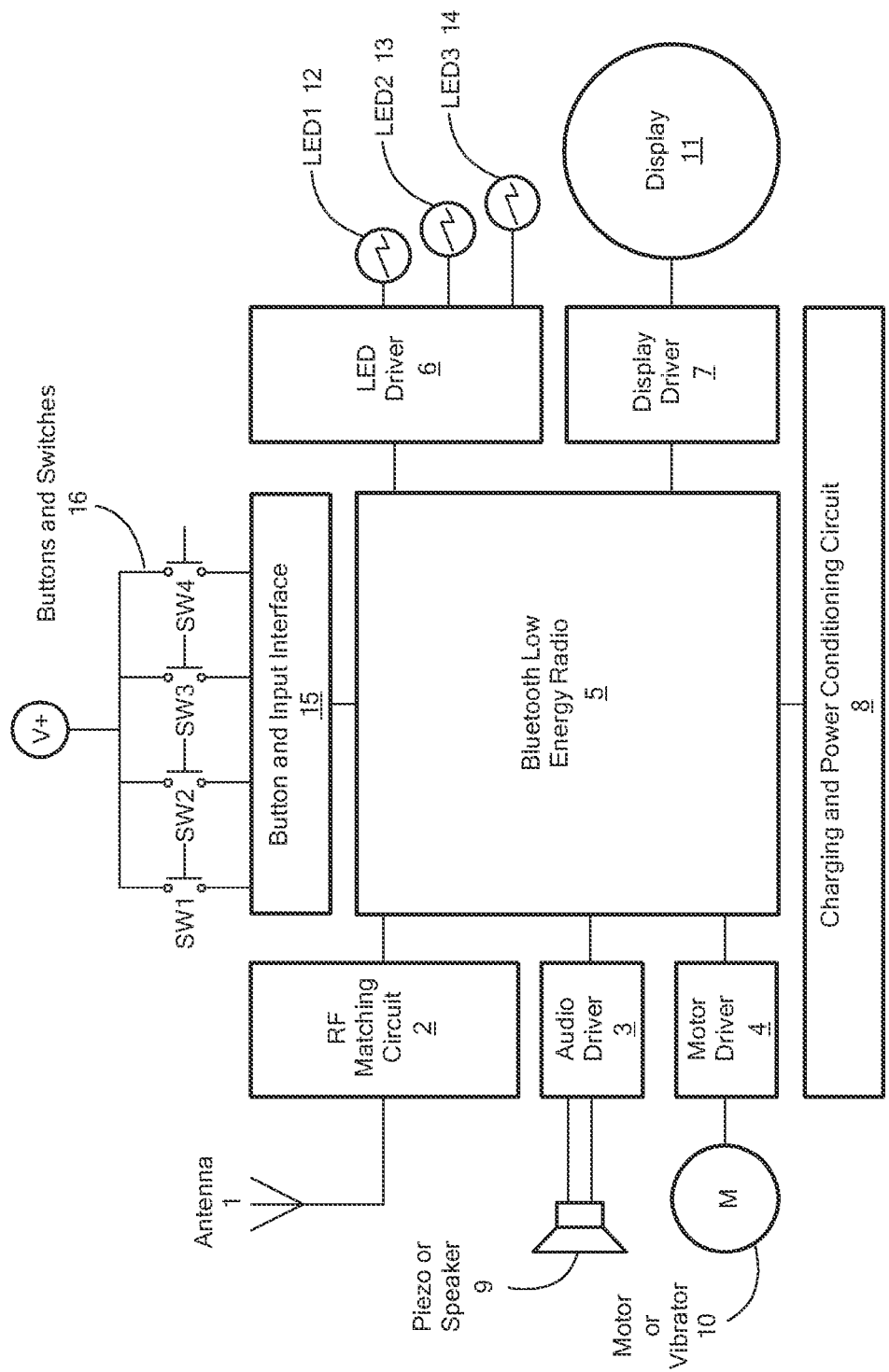
FIG. 1 shows the Connected device platform Block Diagram

One embodiment of the Connected Device Platform may be found in FIG. 1. This connected device platform leverages a Bluetooth® Low Energy Radio 5 System On an Integrated Circuit (SOIC) to manage a Button and Input Interface 15, Audio Driver 3, Motor Driver 4, Display Driver 7 and LED Driver 6. This Bluetooth® how Energy (BTLE) system-on-a-chip (SOIC) 5 receives stable power from a Charging and Power Conditioning Circuit 8 feat also provides the current battery information to the chip via an analog IO. The RF Matching Circuit 2 matches the digital radio's output to the Antenna 1.

Connected Device Protocol Description

Bluetooth® Low Energy Technology defines two Generic Attribute Profile (GATT) roles:
  a. A GATT Client that receives data sent via the Attribute Protocol and that sends Attribute Protocol requests, commands, and confirmations.
  b. A The GATT Server that stores the data transported over the Attribute Protocol and that accepts Attribute Protocol requests, commands and confirmations from the GATT client. The GATT server also responds to requests and sends asynchronous indications and notifications to specified events.

Typically, the GATT server is a device that sends information periodically (such as a sensor) and the GATT client is a mobile device that collects such information.

At the time of this writing, certain mobile phone platforms such as the iOS platform may only support the GATT Client role.

The Connected Device Platform may leverage the Connected Device Protocol, tins proprietary protocol may be designed to run atop of the Bluetooth® Low Energy technology GATT service.

The Connected Device Protocol may support a GATT service relationship as shown in FIG. 17 and may define two distinct roles as follows:
  a. Connected Device Client: The Client may use the Connected Device Service on the Connected Device Server. An example of a client device may be a mobile phone.
  b. Connected Device Server: The Server may be an instantiation of the Connected Device Service. An example of a server device may be a watch or other mobile phone accessory.

Because the Connected Device Protocol enables bidirectional interaction without disrupting the GATT Client and GATT Server relationship, the Connected Device Profile may enable experiences that would otherwise be limbed by the iOS platform or may require more complex role structures to be established.

Furthermore, by simplifying the interactions between the mobile phone and a connected accessory through a simplified, targeted protocol, the Connected Device Profile may enable the rapid implementation of new Connected Device use cases while leveraging the native radio available on the mobile phone platform together with a custom mobile application.

Because of the flexibility of the Connected Device Platform, much of the platform's value lies in how the Connected Device Protocol is interpreted by the application. In order to ensure the optimal experience, active application may take precedence over background applications.

For example, an active photography application may interpret a Short Button Press (SBP) event from a Connected Module as a shutter release and a Long Button Press may trigger the video feature, while a background application may have a different interpretation of the same event(s).

Because of the priority of the active application over the background application, the user may experience the desired outcome of releasing the shutter on a Short Button Press as opposed to the undesired outcome of the background application's interpretation of the same event.

Connected Watch Platform

Figure 2:
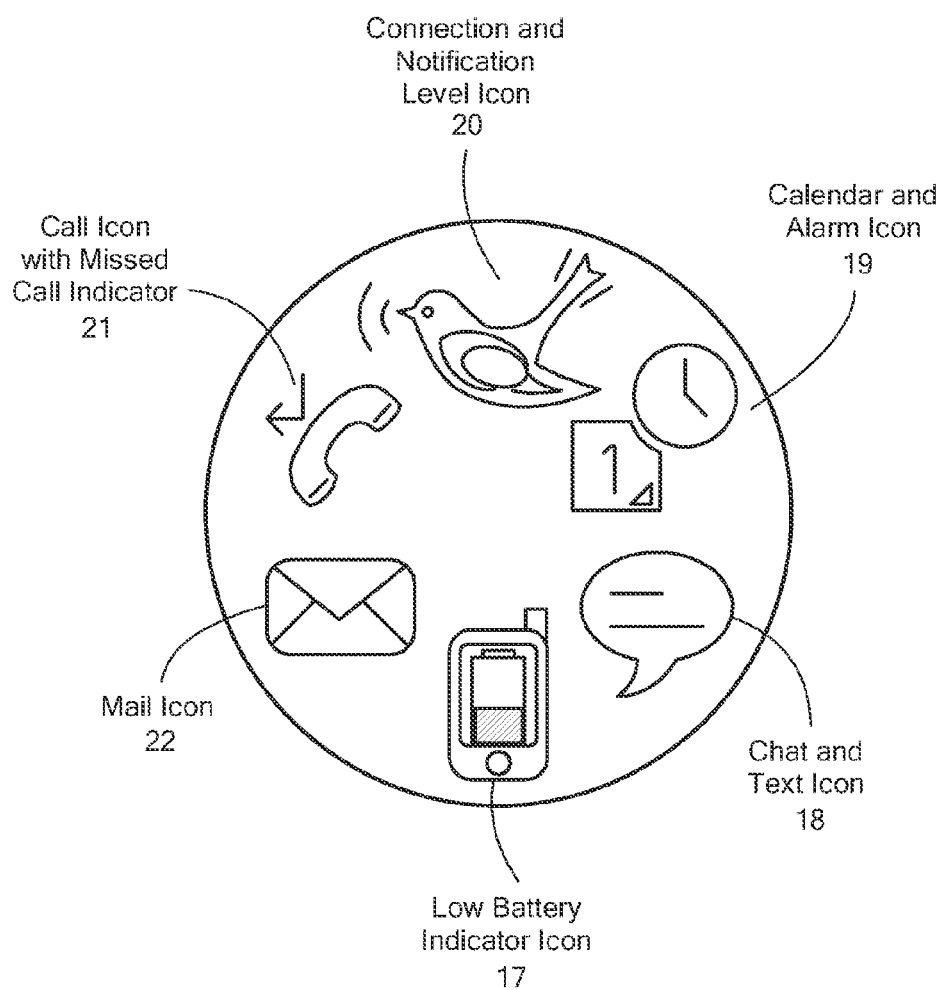
FIG. 2 shows the Connected, device platform Full Segment Watch Display
Figure 3:
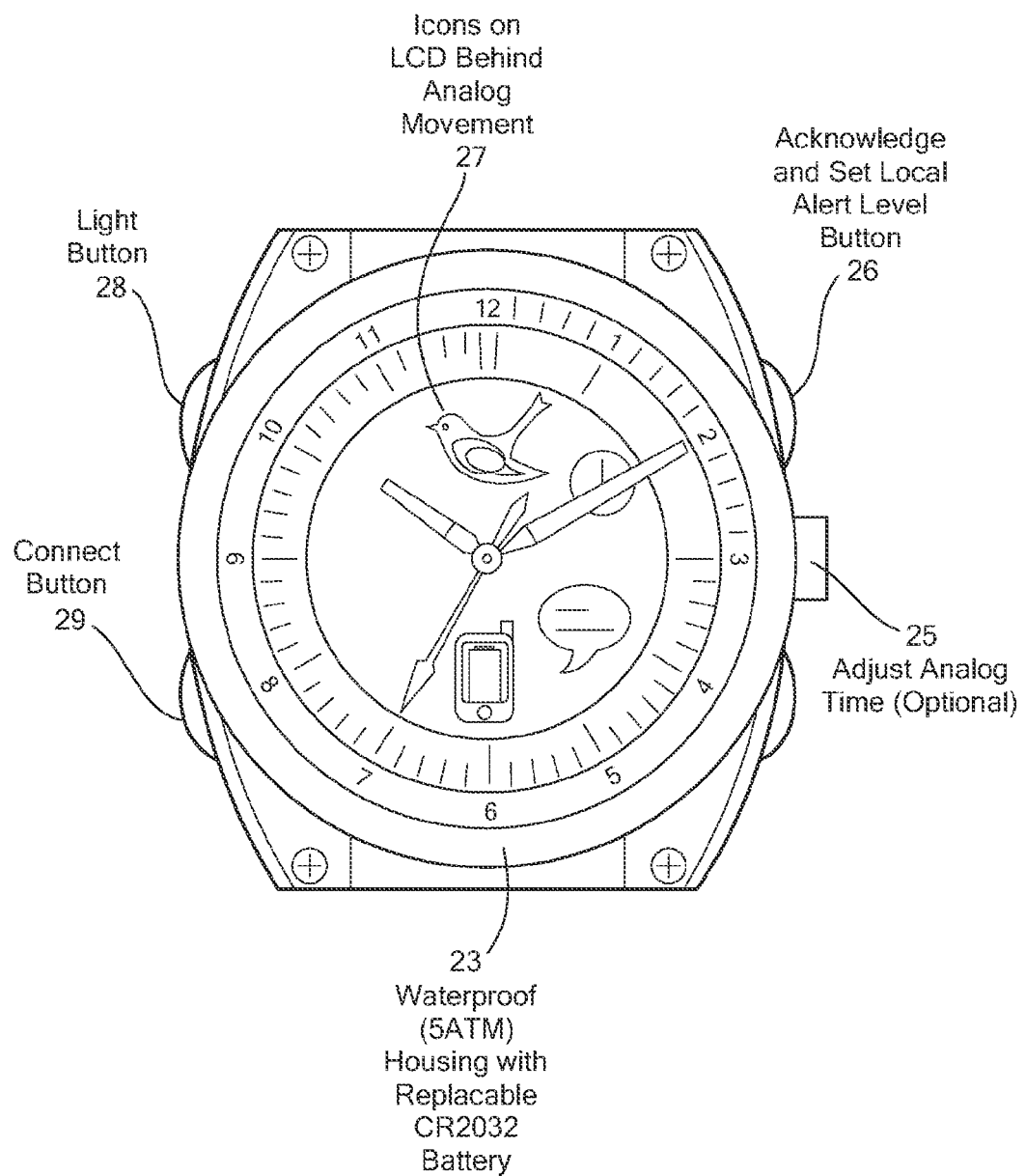
FIG. 3 shows the Connected Watch with Analog Movement

One embodiment of the Connected Watch Platform, as shown in FIG. 3, uses a Full Segment Watch Display as shown in FIG. 2. This Display 11 may be connected via the Display Driver 7 to the Bluetooth® Low Energy Radio 5 and therefore may be controlled directly by the Bluetooth® Low Energy Radio's 5 firmware.

Thus in the event that an incoming email alert is received by the Bluetooth® Low Energy Radio 5 via the wireless link with the mobile phone, then the Display 11 may be updated to display an incoming Mail Icon 22. Simultaneously, the Connected Watch may vibrate and beep to alert the user that something has occurred that requires his or her attention.

Connected Analog Watch Movement

Figure 6:
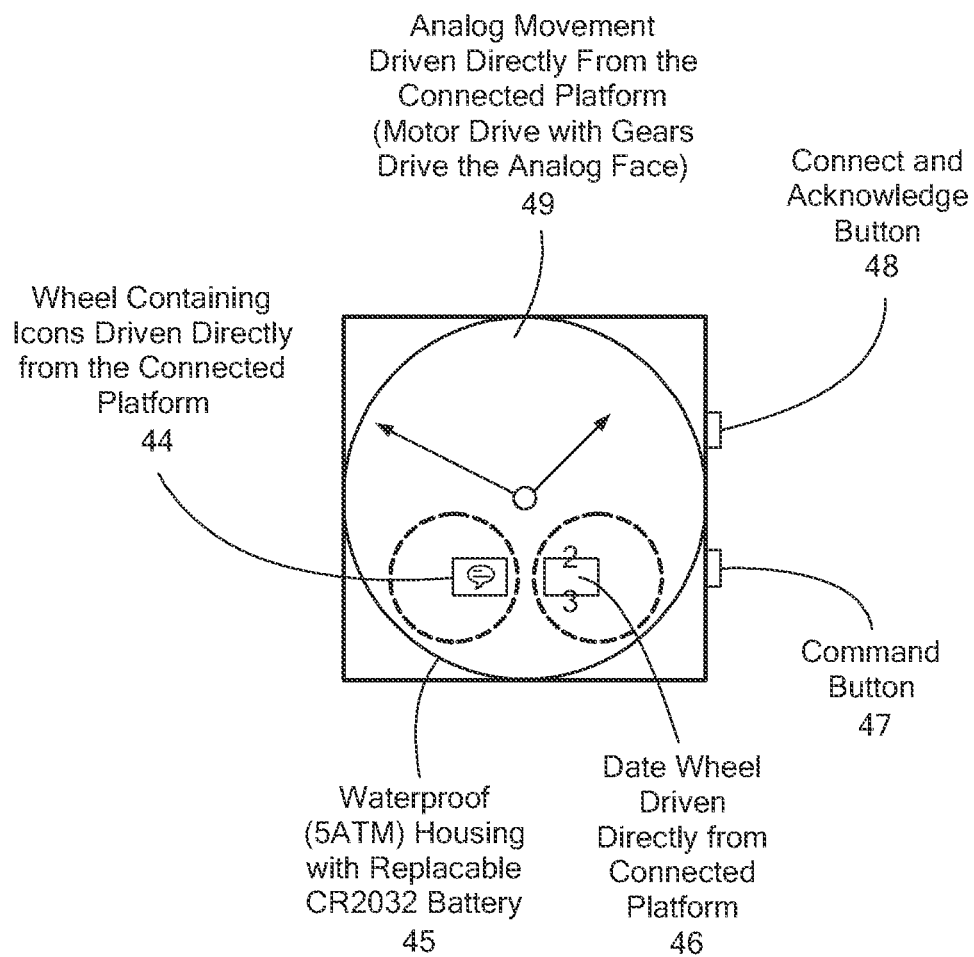
FIG. 6 shows the Connected Analog Watch Movement

Another embodiment of the Connected Watch uses a Connected Analog Movement as shown in FIG. 6. In this embodiment, the analog movement may be driven directly from the Connected Device Platform 49 through the motor driver interface 4. Instead of using digital icons, the analog connected watch movement may use, for example, a wheel 44 containing icons.

Other analog methods may also be used to convey information such as refractive or reflective elements (e.g. mirrors and tenses) controlled by micro-electro-mechanical systems (MEMS), sliders, LEDs, etc. These methods may display different symbols, colors, or shapes that correspond to events that on the mobile device.

These icons may present themselves when commanded to do so by the Connected Device Platform as a result of notifications received by the mobile phone, Similarly, a Date Wheel 46, for example, may be driven directly from the Connected Device Platform and may be set automatically whenever the current date and time information is received via Connected Device Protocol commands sent from the mobile phone.

The Connected Analog Watch Movement shown in FIG. 6 may also be controlled by the user through user interlace elements such as buttons; e.g. a CONNECTED and ACKNOWLEDGE button 48. These user interface elements may be used to manage the Bluetooth® interface and to acknowledge incoming events, and to send events to the mobile phone.

Similarly, other user input devices such as accelerometers, gyroscopes, tactile, capacitive sensors, etc. may also be used to capture user actions and to convey them to the mobile device.

Connected Wristband Module

Figure 4:
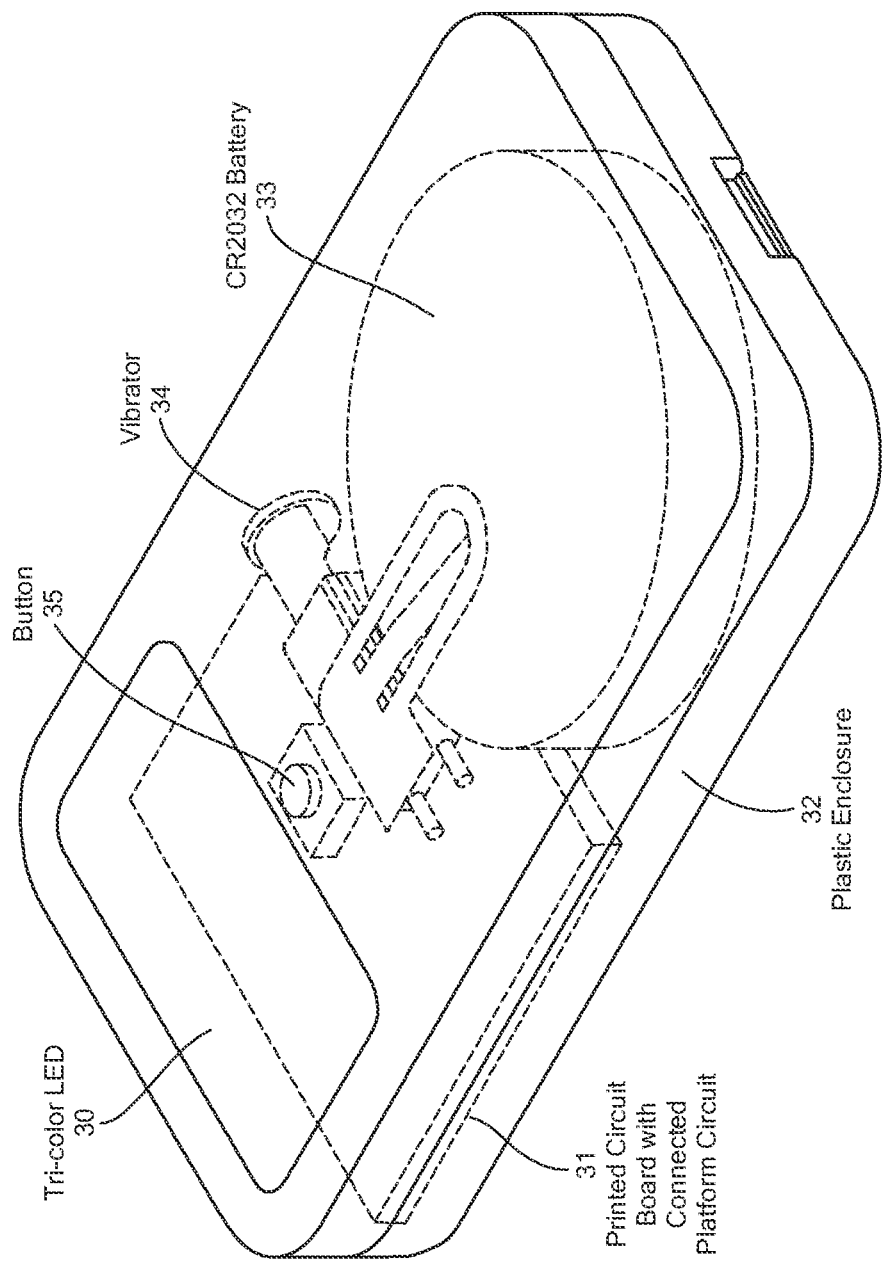
FIG. 4 shows the Connected Module with Vibrator Motor

One embodiment of the Connected Device Module uses a vibration motor to notify users when there is activity on the mobile phone. In this embodiment, the Connected Device Module layout may be optimized to minimize its overall size through the careful layout as shown in FIG. 4. A tri-color LED 30 may be used instead of three separate LEDs, thus reducing the board area further. This module may be integrated into a fabric, leather, rubber, silicone, etc, wristband, thus providing notification directly to the user via a small vibration and displaying to the user of the type of notification through the LED's color.

Figure 5:
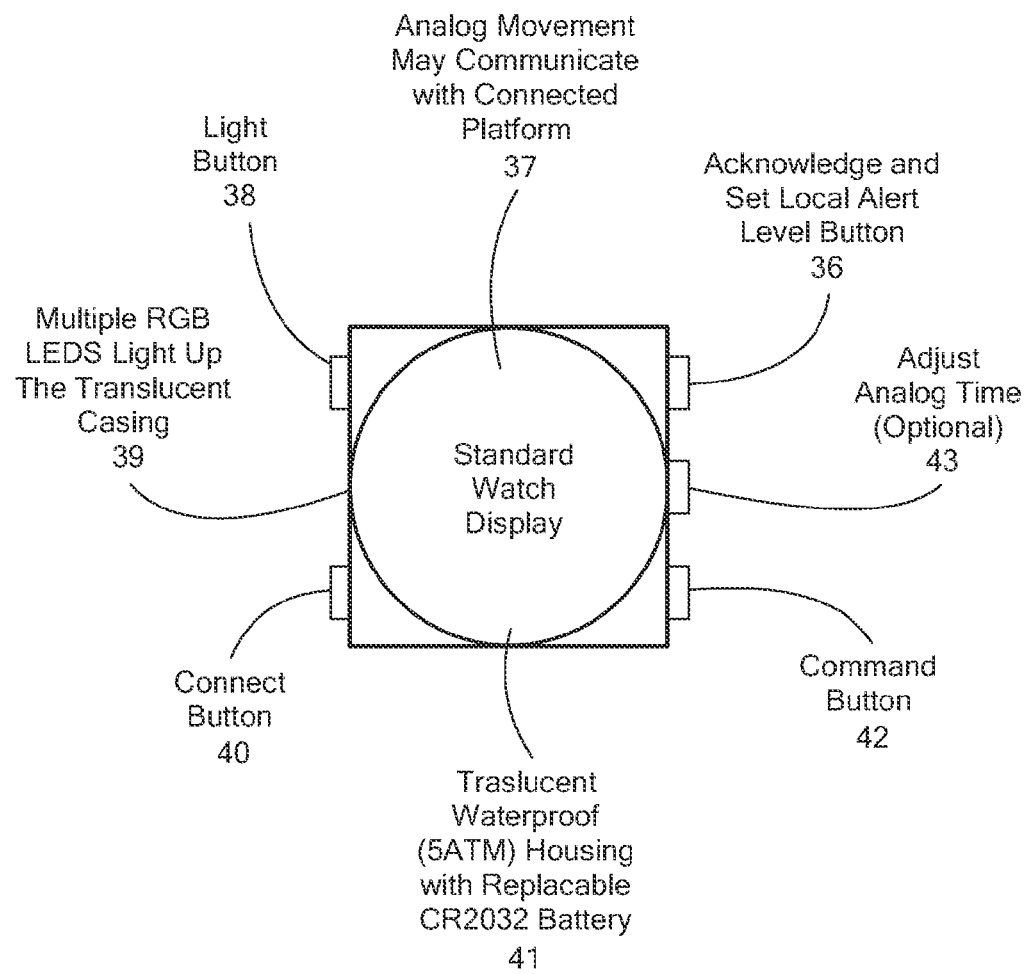
FIG. 5 shows the Connected Illuminated Watch or Wristband

One embodiment of the Connected Wristband Module shown in FIG. 5 may be combined with a standard analog or digital watch. In this embodiment, the Connected device platform may communicate with the Analog Movement 37 via a proprietary protocol and may employ a UART, SPI, or I2C interface in order to receive notifications from the application and to convey user commands to the application via the wireless link. Multiple RGB LEDs 39 may be used to light a translucent casing thus enabling the user to see which type of message has been received through the color of the LEDs.

The Connected Wristband may support, a plurality of user input interfaces including multiple buttons (e.g. a LIGHT button 38 that illuminates the watch face, a CONNECT button 40 that manages the Bluetooth® Low Energy connection, an ACKNOWLEDGE 36 button that is used to acknowledge and cancel messages from the mobile phone, a COMMAND button 42 that is used to trigger mobile phone actions from the wristband).

Other interfaces may include capacitive switches, light sensors, temperature sensors, shock sensors, accelerometers, etc. Each sensor may enable additional methods of interaction with the Connected Wristband or may supply data to the application via the wireless interlace using the Connected Device Profile messages.

The wristband may also support a separate analog time adjustment 43 in order to adjust the time manually while simultaneously supporting time adjustment control from the connected application via the Connected Device Profile and Inter-Chip communication 37. This is accomplished by including a feedback system in the Motor Driver Circuit 4 that identifies the current position of the motor even when manually adjusted by the user.

In this manner, the manually overridden clock adjustment may be conveyed to the application via the wireless link using the Connected Device Protocol and thus that application may know not to leave the adjusted time as set by the user.

The user may also trigger a multitude of actions on the mobile phone through the use of the device's single button through short, medium, or long button presses. These button presses may trigger different actions on the mobile phone through the Connected Device Mobile Phone Application as shown in FIG. 18. Each button and button press type may be uniquely mapped, to a Trigger by the protocol as shown in FIG. 10. These diggers may then be interpreted by the application to perform specific actions.

A short button press, for example, may map to pinning a Point Of Interest on a map as shown in FIG. 22 or may map to triggering the shutter release of the mobile phone's camera. A medium button press, for example may trigger another application to launch automatically as shown in FIG. 23, and a Long Button Press may be used, to trigger alerts such as a phone finder alert as shown in FIG. 24.

Connected Power Cure Communication (PLC) Controller

Because of the flexibility of the protocol, a similar application using the same Bluetooth® Low Energy infrastructure may be used to manage a Bluetooth® Low Energy enabled Power Line Communication (PLC) Controller. Such a controller as shown in FIG. 25 may use the Connected Device Platform 72 to interlace with a standard Power Line Communication (PLC) Light Switch Controller Circuit 80 via a UART Interface 79.

PLC Controllers are used to communicate long distances that would otherwise not be possible using Bluetooth® Low Energy technology. By carrying the Connected Device Protocol across the Power Line Communications network, two Bluetooth® Low Energy enabled PLC Controllers, each plugged into separate locations within a home, may receive information from Bluetooth® Low Energy enabled mobile devices and carry the information to other Bluetooth® Low Energy enabled appliances, or act upon the information received.

For example, if a user was at one end of the house and wanted to check the status of the lights at the other end of the house (which in this example may be too far away for Bluetooth® Low Energy technology to function reliably), the user may use ins or her mobile device to communicate with a Bluetooth® Low Energy enabled PLC Controller that is located in the same room. This Bluetooth® Low Energy enabled PLC controller may then convey this information to the PLC enabled light switch in question.

Connected Headset

The command and control capabilities enabled by the Connected Device Profile (such as the ability to trigger an application or push to talk command with a simple button press on the device by using the Connected Device Protocol) may also be used to manage interactions between a headset and a mobile phone while offering extensive power savings to the headset as a result of the use of the Bluetooth® Low Energy wireless link. This may be accomplished by using two separate radios—one with Bluetooth® Low Energy technology, and the other with traditional Bluetooth® wireless technology.

The Bluetooth® Low Energy radio may then be used to manage the link while there is little or no activity, and to turn on the traditional Bluetooth® radio as soon as it is needed. New Fast Connect Bluetooth® technology may then assist the traditional Bluetooth® radio in rapidly reconnecting, thus offering little or no delay to the user.

Connected Battery

Figure 9:
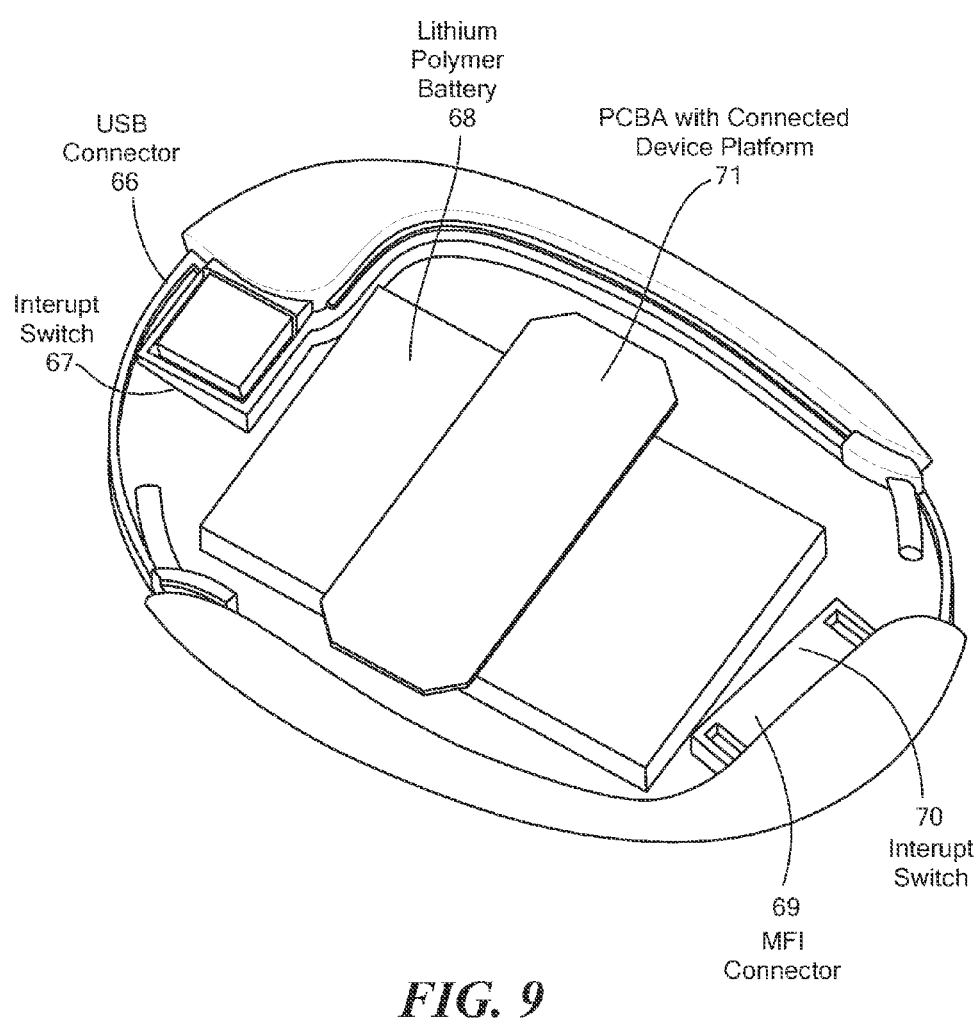
FIG. 9 shows the Connected Battery

One embodiment of the invention may enable users to monitor the battery status of a Connected Battery as shown in FIG. 9 via the application. In this manner, a user with a backup battery may check the backup battery's level of charge from his or her mobile device without ever having to remove the Connected Battery from its charger, or from the bag or pocket in which it is stored.

If the Connected Battery supports wireless or solar charging (e.g. via an inductive charging interface or via solar panels) the Connect Battery may also convey charging information to the user, allowing the user to determine the best position of the Connected Battery on the charging pad or to find the sunniest spot.

Connected Appliance (e.g. Coffee Maker)

One embodiment of the invention may enable users to monitor and control the status of their small appliances (e.g.

coffee maker) via the application. In this manner, a user may, for example, schedule a coffee to be brewed at a specific time, trigger immediate brewing, check the wafer and bean level of the coffee maker, and check to see when the coffee was last brewed, all from their home office desk or the comfort of their bed before getting-up in the morning.

Operation

Connected Device Platform Operation

Figure 8A:
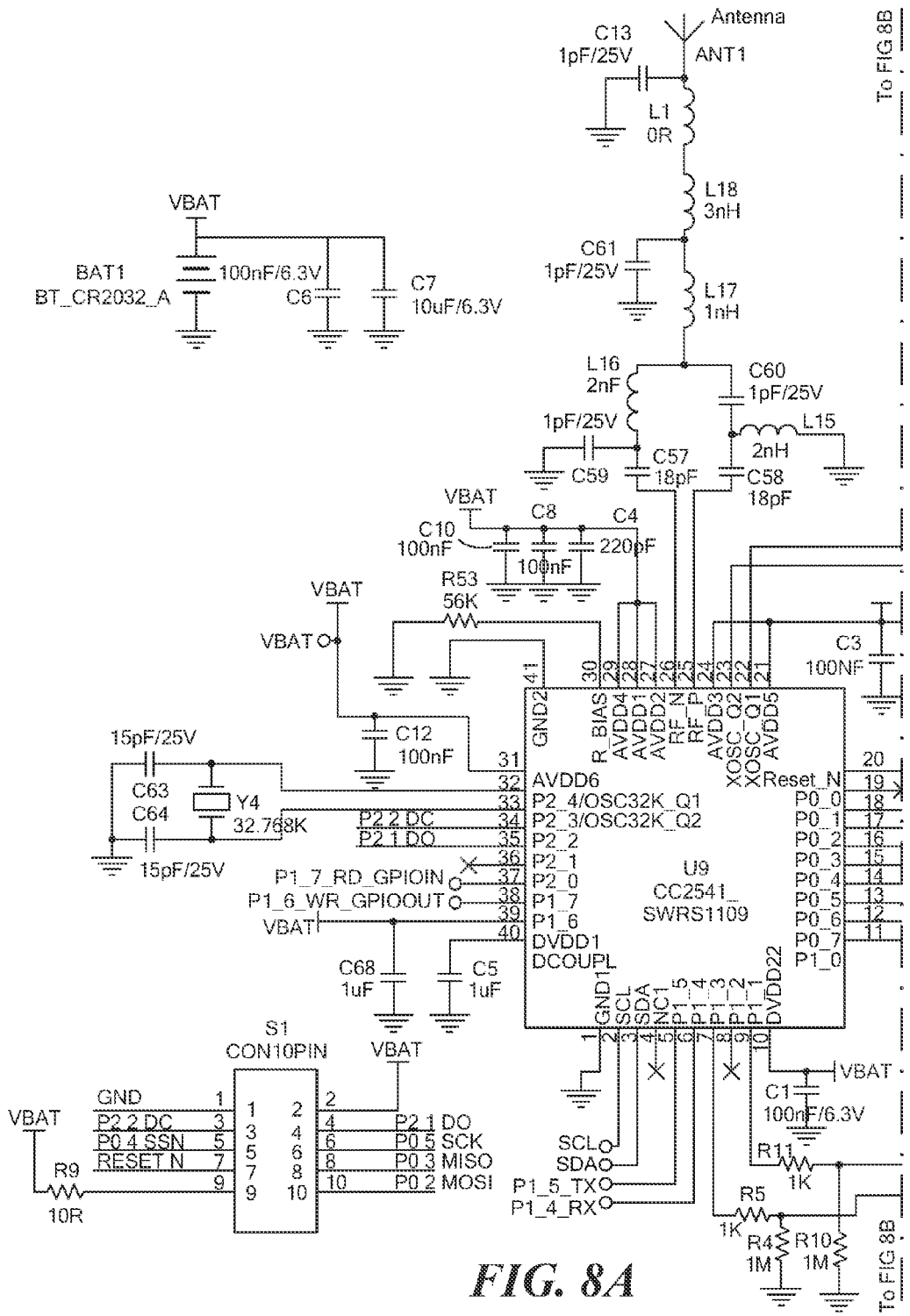
FIG. 8 shows the Connected Band Module Schematic
Figure 8B:
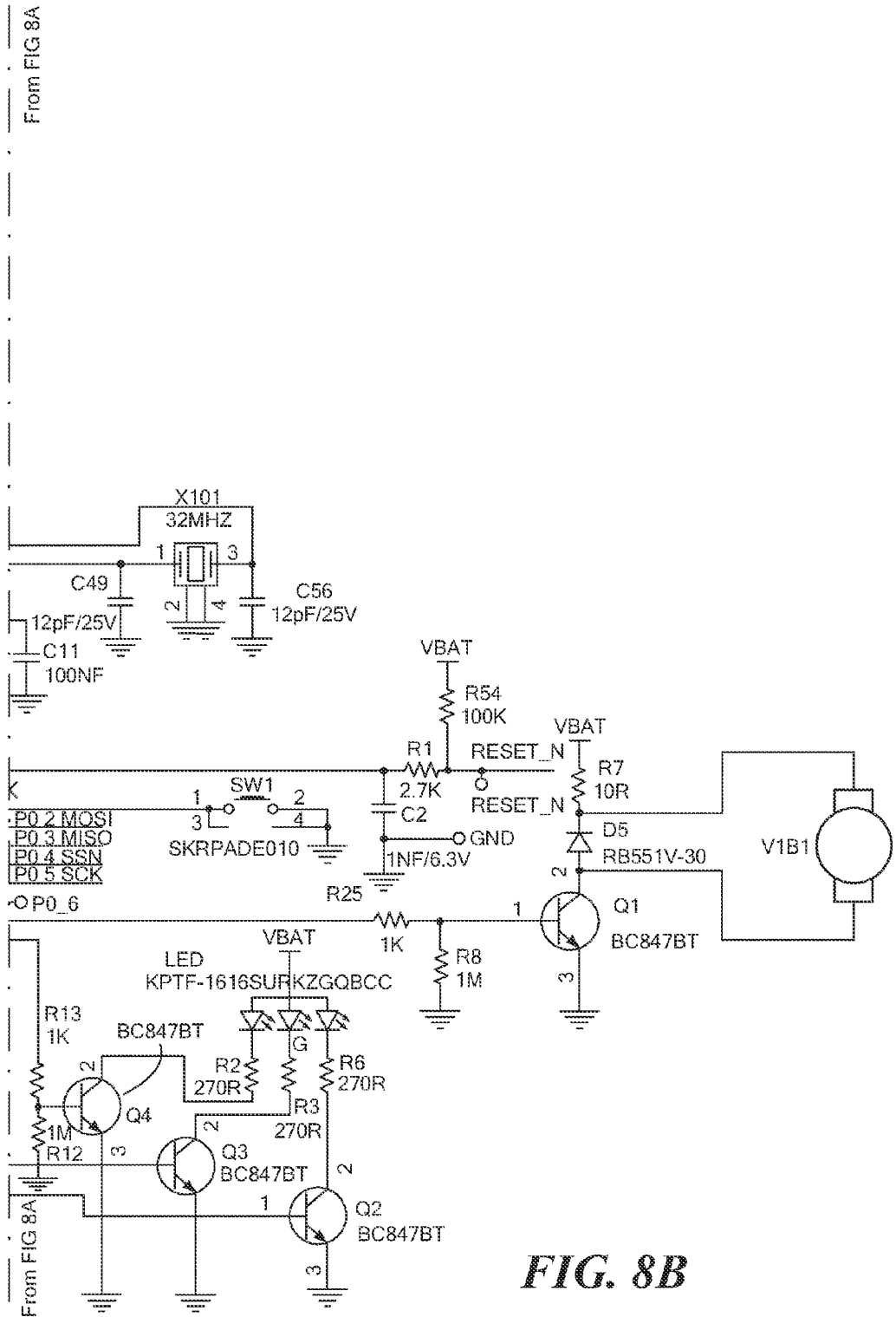

The Connected Device Platform's circuit may be used to manage the user interfaces, send and receive data via the Bluetooth® Low Energy wireless link, and manage inter-chip communication. This circuit as shown in FIG. 8 may be flexible in that one or more of the interface circuits may be removed if not needed, for a specific application. The firmware that controls the circuit, user interfaces, Bluetooth® Low Energy wireless link, etc. may also be modular and may include firmware build switches (used by compilers to turn on-and-off firmware modules, features, and function) and thus compile only those sections of firmware that are required to work with the specific device implementation in question.

This Connected Device Platform may therefore be used to drive a Piezo 9 or other speaker through a pulse-width modulated output provided by the Bluetooth® Low Energy Radio 5 to generate noise whenever an alert is received or when the Bluetooth® Low Energy wireless link is interrupted. Similarly, a Vibrator 10 may be connected via the Motor Driver 4 to vibrate in response to an alert. In another embodiment a stepper motor may be connected to the Motor Driver 4 and be used to rotate an analog watch or a servo directly.

The Connected Device Platform firmware may support three or more different button message types for each button:
  a. MESSAGE A (SBP): Tins is considered a "LOW priority" message.
  b. MESSAGE B (MBP): This is considered a "MED priority" message.
  c. MESSAGE C (LBP): This is considered a "HIGH priority" message.

The message types and button associations may enable unique interactions for each button type that may be interpreted locally or that may be sent via the Connected Device Protocol messages to a mobile device that may in turn support an application that may interpret and act upon the message.

The firmware described above that controls the Connected Device Platform may also support some portions to be enabled and others disabled without impacting the overall functionality of the Connected Device Platform. For example, the button inputs may be masked through Connected Device Protocol commands such that certain button actions are enabled while others are disabled as follows:
  a. Mask Short Button Press (only register Medium and Long Button Presses)
  b. Mask Medium Button Press (only register Short and Long Button Presses)
  c. Mask Long Button Press (only register Short and Medium Button Presses)
  d. Mask Short and Medium Button Press (only register a Long Button Press)
  e. Mask Short and Long Button Press (only register a Medium Button Press)
  f. Mask Medium and Long Button Press (only register a Short Button Press)
  g. Mask Short, Medium, and Long Button Press (button actions have no effect)

In this manner, certain buttons may act immediately upon sensing a button action and support only a single button command while other buttons may support multiple button commands.

Connected Device Protocol

As noted in the description section, the Connected Device Protocol may be a client-server based, protocol that runs atop of the Generic Attribute (GATT) Bluetooth® Low Energy profile.

In order to manage bidirectional interactions using a single client-server protocol, the Connected Device Protocol may support both Read and Write operations.

The read operation for setting the current time on the Connected Watch by obtaining it from the mobile phone (client) is depicted in FIG. 11. The Connected Watch (Server) performs a "Read", "Current Time" operation by sending the said command to the mobile phone (client). The mobile phone (client) then responds with the "Current Time" command response containing the current time information, Write operations are similar to read operations, except that they may include the data that is being written in the body of the message. For example a mobile phone (client) may write a configurable item to the Connected Module (server) as depicted in FIG. 16. In this example, the phone may send a "Write" message that includes "Configurable item" and "Alert Configuration" in the body of the message. The Connected Module (server) may respond with a "Confirm" followed by the "Configurable Item" identifier to confirm that the configurable item setting was successfully written.

Incoming alerts may be managed using an "Unread Alert Status" message. This status message may inform the Connected Device (e.g. watch or other accessory) that there are pending unread events upon connection establishment and the number of unread status messages. This information may be used to notify the user of the presence of an un-acknowledged alert on the mobile device.

An example of an unread status event sequence is shown in FIG. 12. In this sequence, the phone may already have several unread messages on it when the Connected Watch (accessory) establishes its Bluetooth® Low Energy connection. Upon receiving the "Unread Alert Status" message with the Category ID of "SMS" and a non-zero Unread Count, the Connected Watch may respond by setting its "SMS" Icon.

Next, the Connected Watch (accessory) may receive another "Unread Alert Status" message with the Category ID of "Calendar" and an Unread Count of "1". The Connected Watch (accessory) may respond by setting a Calendar alert icon.

The user may then clear all alerts on the mobile phone using the mobile phone's US (e.g. by unlocking the phone and viewing messages). When the user does this, the Connected Application may respond by clearing the "Unread Alert Status" by sending another sequence of "Unread Alert Status" messages with an Unread Count of "0". Upon receiving these messages, the Connected Watch (accessory) may respond by clearing the respective icon.

In some cases, the user may wish to acknowledge an alert directly on the Connected Device (accessory). The Connected Device Protocol enables this by providing a bidirectional link to the user as described in FIG. 13. In the event that an "Unread Alert Status" message is received by the Connected Device (accessory), the user may press the ACKNOWLEDGE button on the Connected Device. This may trigger an "Alert Acknowledged" message from the Connected Device with a Category ID Mask of "Email", thus clearing the Unread Status Alert.

When real-time events are occurring (such as an incoming call). The Connected Device Protocol may be used to notify the user of the incoming call (e.g. in the case of a Connected Watch, Connected Module, or Connected Wristband) or may be used to turn on a standard Bluetooth® Headset Circuit as in the case of the Connected Headset. In either case, the protocol notifies the Connected Device as described in FIG. 14 whereby the Incoming Call on the mobile phone triggers an "Unread Alert Status" message with the Category ID corresponding to "Call" and an Unread Count corresponding to "1". This triggers a local alert on the Connected Device.

If the call is accepted, an "Unread Alert Status" with Category ID of "Call Active" and Unread Count, of "1" is sent, and when the call ends, an "Unread Alert Status" with Category ID of "Call Active" and an Unread Count of "0" is sent, thus clearing the call icon.

Unlike standard Bluetooth® Low Energy protocols that separate alerts from phone status information, this simplified protocol enables phone status to be managed through a single command thereby reducing the complexity of the implementation, while ensuring that all necessary information is available to device.

As somebody experienced in the art may appreciate, similar messages may be constructed tor other alerts and similar techniques may be used to clear alerts both locally and remotely. Furthermore, the protocol may be extended to include use-case specific commands, messages, and alerts thus enabling great flexibility with very limited overhead.

Connected Watch Platform and Movement

The Connected device platform with Full Segment Watch Display (FIG. 2) and Connected Watch with Analog Movement (FIG. 3) may be integrated into a number of different connected watches. Because the Connected Watch Platform uses the same crystal frequency as a standard high-accuracy quartz watch platform (32.768 KHz), the connected watch platform may be equivalent or better at keeping the time than a traditional quartz watch because the time may be adjusted frequently to match the network time of the mobile device.

When the Connected Watch connects with a mobile device, it may update its current time setting by receiving the current time as shown in FIG. 11. The Connected Watch may then change the current time setting by using the motor control driver 10 to adjust the position of the hands or its display driver to change the current time displayed on the digital watch face to match the time of the mobile device.

This is particularly important to users who travel between timezones as they no longer need to worry about manually setting their watch's time. Should they choose to override the time set by their phones, however, users may change their preferences using their Connected Application or override the time displayed on their watch by manually adjusting the time using the analog time adjustment crown 25.

Typical devices that receive a reference time (e.g. atomic time that may be sent via a unidirectional RF link) do not typically support the ability to override the time by adjusting the time directly on the watch. If such a function is supported, the watch does not typically report-back the adjustment to the clock source. In this embodiment of the invention, however, the watch may report-back the adjusted time to the application by reading the change of time triggered by the user (for example through the use of positional sensors on the analog movement) and may then report the said changes back to the application.

The application may then store the altered time in non-volatile memory, and may present it back to the user via the application's user interface. The user may then decide, from the application, whether or not he or she wishes to once again use the network time setting, or whether he or she prefers to continue using the local time setting on the watch.

Connected Wristband

The Connected Wristband and Connected LED Watch body may be used to convey information to the user, and to accept commands from the user who does not want to wear a Connected Watch but wants the benefits of receiving notifications directly on his or her wrist by using vibrations and LED colors to convey mobile device status information. This mobile status information may be conveyed via the Connected Device Protocol via a Bluetooth® Low Energy wireless link.

LEDs may be controlled through the LED Driver Circuit 6 as shown in FIG. 1. By using a tri-color LED (12, 13, 14), the Connected Wristband and Connected LED Watch display may convey alert information corresponding to activity on the connected mobile device through the use of blended colors thus creating an effective infinite spectrum of available colors.

In one embodiment of the Connected Wristband, a sensor circuit may be added that conveys additional information such as health and wellness data, activity level, mood, etc. to the Connected Device Platform via the UART interface. Sensor data may include directional, barometric, temperature, humidity, activity, biometric, heart rate, pulse, and other data. This data may be processed by the Connected Device Platform or by a secondary processor to create a metric that may be sent directly to the mobile device via the Connected Device Platform along with the raw or compiled data. This information may be then interpreted by the application and used to provide the user with information pertaining to, for example, their activity level, state of wellbeing, state of arousal, etc.

Should the data be processed by the Connected Device Platform prior to being transmitted to the mobile device, the data may be used to assess the user's emotional or physical state of being and to form a metric. This metric may be based-on a multitude of sensor inputs, such as an elevated heart-rate, reduced physical activity level as denoted by less acceleration, increased sweat secretion as measured through galvanic skin response, etc.

In one embodiment of the invention, sensors may be fitted to the Connected Wristband that observe the user's heart rate, skin temperature, galvanic skin response, blood pressure, and activity level. This data may then be processed to establish a "Stress Score". The stress score may be sent every few seconds to the mobile device where an application may display the Stress Score to the user and may inform the user should the stress score exceed certain predetermined thresholds via the application's UI.

As can be appreciated by someone skilled in the art, should the heart rate or blood pressure exceed certain thresholds while the activity levels are low, then the stress score may be higher. Similarly, should the heart rate rise during vigorous activity, the stress score may be considerably lower since an elevated heart rate is an expected physiological response to strenuous activity.

Activity may be measured using multi-axis accelerometers or other motion sensing elements. This activity level may then be uniquely compared with baseline activity levels as established through experimentation and thus provide an accurate assessment of actual physical activity.

Connected Power Line Communication (PLC) Controller

The Connected PLC Controller may use a Bluetooth® Low Energy SOIC 77 to convey home management information via encapsulated PLC messages through the Bluetooth® Low Energy interface to a mobile application equipped with a Connected Device home management application. In doing-so, the mobile application may be used to manage all devices that are thus enabled within the home through the Bluetooth® Low Energy enabled PLC Controller. The Connected Device home management application may also interpret the PLC status information and may convey the information to the user via the application's UI.

The user may thus control light switches and other home automation directly from his or her smartphone via the mobile application. The Connected Device Protocol described in FIG. 10 may then encapsulate PLC home automation commands from the application and convey them to the Connected Device Platform 72. The Bluetooth® Low Energy Radio SOIC may then convey these commands via the UART interface 79 to the PLC Light Switch Controller Circuit 80 that may then turn on/off the lights or trigger other actions throughout the home.

For homes already fitted with PLC home management systems, the user may retrofit PLC Controllers with Bluetooth® Low Energy enabled. PLC Controllers in selected rooms or regions within the home that he or she would like to manage from his or her application. Thus the user may, from these respective rooms, access the home management system directly using the application.

As can be appreciated by someone skilled in the art, other forms of home automation environments may also be extended through the addition of the Connected device platform. Examples may include home automation environments that are interface directly the internet via a cable or Wi-Fi connection, home automation environments that were installed using specially routed cables, etc.

Such home automation environments may currently require server infrastructures to enable control through a mobile device application or a mobile device's internet connection and may not readily support direct interaction with a mobile application.

By adding the Connected Device Platform to these home automation environments through an available UART interface, home automation devices may be inexpensively upgraded to support direct control by the user via the mobile device application.

Connected Headset

In one embodiment of the Connected. Headset shown in FIG. 7, the Bluetooth® Low Energy wireless link may be maintained with the Bluetooth® Low Energy Radio SOIC 55 while the Standard Bluetooth® Headset Circuit 58 may be disabled, to reduce power consumption (e.g. by driving the RESET line) until an event is received such as an incoming call. Upon receiving the incoming call, the Connected device platform 50 may wake the Bluetooth® Headset Platform 65 via the Control Lines 57 (e.g. by releasing the RESET line).

Figure 7:
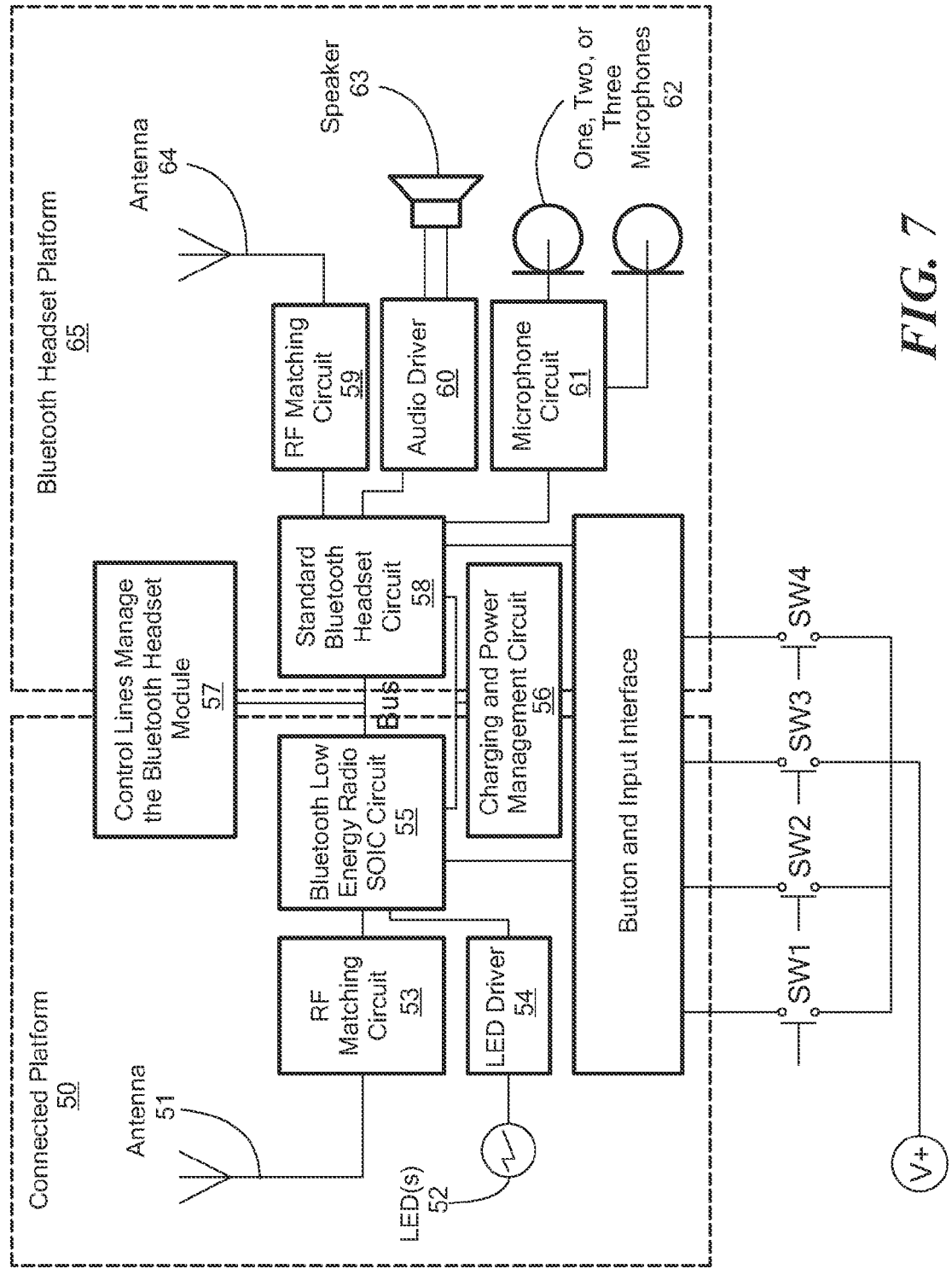
FIG. 7 shows the Connected Headset Block Diagram

The Connected Headset may also extend, the capability of the standard headset by providing Push To Talk through the use of a designated Push To Talk button (e.g. SW1 in FIG. 7). When the Push To Talk button is pressed, the Bluetooth® Low Energy Radio SOIC Circuit 55 receives user input via the Button Interface Circuit and triggers a Connected Device Protocol to be sent via the Bluetooth® Low Energy interface via the Bluetooth® Low Energy Antenna 51 to the Connected Application. Simultaneously, the Bluetooth® Low Energy Radio SOIC Circuit 55 wakes the Standard Bluetooth® Headset Circuit 58 that then reconnects to the Mobile Phone, When the application receives the Push To Talk command from the Connected device platform 50, it may initiate the Push To Talk event through, a peer-to-peer or walkie-talkie type of application (e.g. TalkBox®, WhatsApp®, Skype®) to a preconfigured recipient (as setup in advance by the user) and may open a Bluetooth® Headset Profile or Bluetooth® Handset Profile audio channel (ESCO). (TALKBOX is a registered trademark of Jamal Hartwell in the U.S. and other countries; WHASTSAPP is a registered trademark of Whatsapp, Inc. in the U.S. and other countries; SKYPE is a registered trademark of Microsoft Corporation, in the U.S. and other countries), When the user has completed the Push To Talk event, he or she may press the Push To Talk button again thus triggering a command to be sent via the Bluetooth® Low Energy interface to the end the Push To Talk event. Simultaneously, the Bluetooth® Low Energy Radio SOIC Circuit 55 may send a command to the Standard Bluetooth® Headset Circuit 58 to close the audio connection.

Upon completion of the Push To Talk event, the Standard Bluetooth® Headset Circuit may once-again return to its lowest power state by exclusively using the Bluetooth® Low Energy link for control, thus conserving battery life.

In the event that an incoming call is received, the Connected device platform 50 may receive the incoming call event via the Bluetooth® Low Energy interface and may wake the Standard Bluetooth® Headset Circuit 58 triggering a reconnect. The user may then accept the call by pressing the call button (e.g. SW4) just as he or she would with a standard Bluetooth® wireless headset.

Similarly, the volume may be controlled through the volume control buttons (e.g. SW2 and SW3) by either the Bluetooth® Low Energy Radio SOIC Circuit 55 or the Standard Bluetooth® Headset Circuit 58 though it is generally more practical to use the Standard Bluetooth® headset Circuit 58 to manage the volume directly.

Connected Battery

The Connected Battery may support one or more power interrupt switches (67, 70) that ensure that power is not connected to the charging circuits when not in active use. In this manner, the Connected Battery has minimal passive drain with only the Connected Device Platform 71 drawing any power. This is important, as reducing the accumulated passive power drain from charging circuits worldwide may have a significant positive impact on the reduction of worldwide electricity consumption.

In the case of the Corrected Battery, the battery status commands may be used via the Connected Device Profile as shown in FIG. 10 to convey the battery status information to the application that is running on a mobile device. Thus the user may check the status of the Connected Battery without having to pull the battery out of his or her bag, drawer, or charging bay.

These status commands may carry other information as well, including the current charging rate, anticipated time when the charging will complete, etc. This information may be displayed graphically on the Connected Battery's mobile application.

Charging information may be gathered through the Connected Device Platform's Analog to Digital converter inputs (ADC IOs). The power may be conditioned through the Charging and Power Conditioning Circuit 8 and may generate a "charging quality" metric. This metric may then be sent intermittently over the Bluetooth® Low Energy wireless interface using a Connected Device Protocol message.

Connected Appliance (e.g. Coffee Maker)

The user may have an application that is connected via the bidirectional low power wireless link to the Connected Appliance as shown in FIG. 32. Because the application uses the Connected Device Protocol, it may issue simple messages to the Connected Appliance (e.g. Coffeemaker) that are interpreted by the appliance's Connected Device Platform. The Connected Device Platform, in turn, may send appliance status information to the application via the same bidirectional low power wireless link.

Whenever the mobile device connects to the appliance, it may send its current time information using the predefined Connected Device Protocol commands. The appliance may, in turn trigger actions such as brewing coffee, checking the water and bean level and alerting when the levels exceed certain minimum thresholds, or communicating when the coffee was last brewed. The user may therefore manage the appliance from his or her home office desk or the comfort of his or her bed before getting-up in the morning.

In order to integrate with existing appliances, the Connected Device Platform may communicate to appliances through a pre-existing UART interface that may be available for debugging in the standard appliance. In this manner, appliances may be able to relay their information to the Connected Device Platform without requiring significant hardware changes (e.g. the Connected Device Platform may easily be wired-in to the appliance). This reduces the design complexity and enables rapid.

SUMMARY OF FEATURES

To summarize, the following concepts, devices, and features are captured in the preceding description:
 a. A wireless device platform that communicates directly and bidirectionally with an application through a protocol running atop of a wireless interface that:
   i. Enables the device to receive status notifications
   ii. Enables the device to receive commands
   iii. Enables the device to send status information
   iv. Enables the device to send commands
 b. The wireless device platform (a) that supports one or more visual indicators
 c. The wireless device platform (b) that supports one or more LEDs
 d. The wireless device platform (b) that supports a display
 e. The wireless device platform (a) that supports an audio output device
 f. The wireless device platform (a) that supports a vibrating device
 g. The wireless device platform (a) that supports a motor control device
 h. The wireless device platform (g) that can detect the precise motor position
 i. A wireless device platform that can convert precise motor position into the time and convey the time information to a mobile application via a protocol running atop of a wireless interlace.
 j. A wireless device platform that can receive time information from a mobile application via a protocol running atop of a wireless interface, convert the time information into a precise motor position, and actuate a motor to set the precise motor position.
 k. A wireless protocol that supports the Bluetooth® Low Energy Generic Attribute (GATT) Profile Client and Server roles, while enabling full bidirectional interaction between a GATT Client and GATT server.
 l. An application that interprets wireless protocol messages (k) from the device to display status information or to initiate an action and sends wireless protocol messages (k) to the device to trigger device actions.
 m. A watch that receives information from a mobile device via the wireless protocol messages (k), notifies the user of the incoming messages through haptic or audio feedback, displays context-specific information to the user through lights and/or icons and wirelessly provides control over certain mobile device functions as configured by the mobile device application (l).
 n. A wristband that receives information from a mobile device via the wireless protocol messages (k), notifies the user of the incoming messages through haptic or audio feedback, displays context-specific information to the user via color-coded lights, and wirelessly provides control over certain mobile device functions as configured by the mobile device application (l).
 o. A wristband (n) that contains a plurality of sensors that measure the stress level of the user and convey the said stress level to a mobile device application (l).
 p. An application that interprets stress level information received from the wristband (o), monitors the stress level over time, and conveys the stress level to the user.
 q. A wireless device platform that communicates directly and bidirectionally with an application through a protocol running atop of a wireless interface and that interfaces directly with a Power Line Communications Controller so as to extend a Power Line Communications Controller-based system interface to a mobile application.
 r. A device that supports both a Bluetooth® wireless interface and secondary low power wireless interlace whereby:
   i. The Bluetooth® wireless interlace connects with a mobile device
   ii. The Bluetooth® wireless interface is used to send and receive audio
   iii. The low power wireless interface connects with an application running on the same mobile device
   iv. The low power wireless interface is used to manage the Bluetooth® wireless interface in order to minimize power consumption
   v. The low power wireless interface is used to manage notifications to the device
   vi. The low power wireless interface is used to send control information to the mobile device
 s. A backup battery that supports a low power wireless interlace whereby:
   i. The low power wireless interface connects wife a mobile application
   ii. The low power wireless information is used to convey status information about the battery
   iii. The low power wireless interface is used to receive control and status information from the application and convey the said information to the battery
 t. The backup battery (s) that conveys its current charge level to the mobile application.
 u. The backup battery (s) that supports inductive charging
 v. The backup battery (s) that supports solar charging
 w. The backup batteries (u) and (v) that measure charging rate and convey it to the mobile application.
 x. The backup battery (s) that receives wirelessly status information from the mobile application and displays it to the user via lights and/or a display.
 y. An appliance that supports a low power wireless interface whereby:
   i. The low power wireless interface connects with a mobile application
   ii. The low power wireless interface is used to convey status information about the appliance
   iii. The low power wireless interface is used to receive control information from the application and convey the said information to the appliance
 z. An appliance (y) that synchronizes its current time with the mobile device application upon connection establishment
 aa. An appliance (y) equipped with sensors that sense status information and that conveys the status information to the mobile application bb. An appliance (y) that receives wirelessly status information from the mobile application and displays it to the user via lights and/or a display.

cc. An appliance (y) that receives wirelessly commands from the mobile application and initiates actions based on a received command.

Bluetooth® technology has enabled the creation of ad-hoc Personal Area Networks that enable rich interactions between devices. Traditional Bluetooth® technology has, however, been limited to devices that require frequent recharging on account of its power requirements. This has led to the development of Bluetooth® Low Energy technology. Standard Bluetooth® Low Energy technology, however, lacks a consistent platform implementation that easily adapts to existing devices such that they can be added to ad-hoc networks.

With existing Bluetooth® Low Energy technology there is no consistent method for checking device status information, and conveying mobile device information (e.g. social network alerts) to a device. Furthermore, some platforms are limited in that they support only either the Bluetooth® Low Energy Generic Attribute Profile Ghent or Server roles. Thus existing Bluetooth® Low Energy Profiles may not be applicable to these devices.

The Connected Device Platform connects ordinary devices such as watches, wristbands, batteries, and appliances to the mobile phone via a Bluetooth® Low Energy link and the Connected Device Protocol. This platform thereby enables new and exciting connected applications whereby ordinary devices are turned into Connected Devices that support status and control functions that may be managed from a mobile device application.

Having described various embodiments, which serve to illustrate various concepts, structures and techniques, which are the subject of this patent, it will now become apparent to those of ordinary skill in the art that other embodiments incorporating these concepts, structures and techniques may be used. Accordingly, the scope of the patent should not be limited to the described embodiments but rather should be limited only by the spirit and scope of the following claims.

What is claimed is:

1. A system comprising:
   a watch having one or more event indicators and a watch movement comprising:
      a face;
      at least one mechanical indicator;
   an analog time adjustment for adjusting the at least one mechanical indicator; and
      a motor driver circuit for driving the at least one mechanical indicator including a feedback system to identify a current position of the at least one mechanical indicator and identify an adjusted time when the time is manually adjusted by the analog time adjustment;
   a microprocessor, included in the watch, coupled to the event indicators, the microprocessor comprising a communication radio and configured to:
   communicate the adjusted time to an application in wireless communication with the watch, the application configured to adjust a notification event based on the adjusted time;
      receive, via the radio, the notification event from the application; and
      in response to receiving the notification event, activate at least one of the event indicators of the watch movement.

2. The system of claim 1 further comprising controlling, by the microprocessor, a time displayed by the watch movement.

3. The system of claim 1, wherein the watch movement is an analog watch movement or a digital watch movement.

4. The system of claim 1 wherein the event indicators comprise icons on a face of the watch movement.

5. The system of claim 1 wherein the event indicators comprise one or more LEDs, a vibration motor, a speaker, or a combination thereof.

6. The system of claim 1 further comprising a coin-cell battery coupled to power at least the watch movement and the communication radio.

7. The system of claim 6 wherein the microprocessor is further configured to send a notification of a charge level of the battery to the application.

8. The system of claim 1 wherein the microprocessor is further configured to set a time of the watch movement after receiving a current time from the application.

9. The system of claim 1 wherein the notification of the event comprises a notification of an email received by the, a notification of a text received by the application, a notification of a calendar event received by the application, a notification of a missed call from the application, or a combination thereof.

10. The system of claim 1 wherein the microprocessor is configured to receive the notification from a tablet or smartphone.

11. The system of claim 1 wherein the microprocessor is configured to communicate with the application via a Bluetooth low energy protocol.

12. The system of claim 1 wherein the microprocessor and radio are powered by a non-rechargeable, coin-cell battery.

13. The system of claim 1 wherein the application is a mobile application executing on a Bluetooth enabled device.

14. A method of controlling a watch comprising:
   controlling, by a microprocessor, one or more event indicators coupled to a watch;
   driving, by a motor driver circuit, one or more watch hands on a face of the watch;
   receiving, by the microprocessor, indication of a time adjustment from the motor driver circuit in response to a time adjustment of the watch;
   wherein receiving the indication of the time adjustment includes identifying, by a feedback system of the motor driver circuit, the current position of the watch hands;
   transmitting, by the microprocessor, a notification of the time adjustment to a Bluetooth® device via a Bluetooth low energy communication protocol;
   receiving one or more event notifications that incorporates the adjusted time from the Bluetooth device; and
   activating one or more of the event indicators in response to receiving the one or more notifications.

15. The method of claim 14 further comprising controlling, by the microprocessor, a movement of the watch.

16. The method of claim 14 wherein controlling the watch movement comprises controlling an analog watch movement or a digital watch movement.

17. The method of claim 14 wherein controlling the event indicators comprises controlling icons on a face of the watch movement.

18. The method of claim 14 wherein controlling the event indicators comprises controlling one or more LEDs, a vibration motor, a speaker, or a combination thereof.

19. The method of claim 14 further comprising providing power to the system from a coin-cell battery.

20. The method of claim 19 further comprising sending, from the microprocessor to the Bluetooth device, a notification of a charge level of the battery.

21. The method of claim 14 further comprising setting a time of the watch movement after receiving a current time from the Bluetooth device.

22. The method of claim 14 wherein receiving the notification comprises receiving a notification of an email that was received by the Bluetooth device, a notification of a text that was received by the Bluetooth device, a notification of a calendar event from the Bluetooth® device, a notification of call missed by the Bluetooth device, or a combination thereof.

23. The method of claim 14 wherein receiving the notification comprises receiving the notification from a smartphone.

24. The method of claim 14 wherein communicating with the Bluetooth device includes communication via a Bluetooth low energy protocol.

25. The method of claim 14 further comprising powering the watch with a coin-cell battery.

26. The method of claim 14 wherein communicating with the Bluetooth device includes communicating with a mobile application executed by the Bluetooth device.

27. The system of claim 1 wherein the at least one mechanical indicator comprises one or more watch hands.

28. The method of claim 14 further comprising wirelessly communicating the time adjustment to an application in wireless communication with the watch.

29. A system comprising:
a watch having one or more event indicators and a watch movement comprising a face, watch hands, a motor driver circuit for driving the watch hands, and an analog time adjustment for adjusting the watch hands;
a microprocessor, included in the watch, coupled to the event indicators, the microprocessor comprising a Bluetooth® low energy radio and configured to:
receive, from the motor driver circuit, an indication of a manual adjustment of a time setting of the watch;
communicate, via the Bluetooth low energy radio, the adjusted time setting to an application in wireless communication with the watch;
receive, via the radio, a notification of an event that incorporates the adjusted time from the application;
in response to receiving the notification, activate at least one of the event indicators of the watch movement.

* * * * *